US011102199B2

(12) United States Patent
Hamid

(10) Patent No.: US 11,102,199 B2
(45) Date of Patent: Aug. 24, 2021

(54) METHODS AND SYSTEMS FOR BLOCKING MALWARE ATTACKS

(71) Applicant: Laurence Hamid, Ottawa (CA)

(72) Inventor: Laurence Hamid, Ottawa (CA)

( * ) Notice: Subject to any disclaimer, the term of this patent is extended or adjusted under 35 U.S.C. 154(b) by 596 days.

(21) Appl. No.: 15/233,008

(22) Filed: Aug. 10, 2016

(65) Prior Publication Data
US 2017/0048257 A1 Feb. 16, 2017

Related U.S. Application Data

(60) Provisional application No. 62/220,511, filed on Sep. 18, 2015, provisional application No. 62/202,962, filed on Aug. 10, 2015.

(51) Int. Cl.
| | |
|---|---|
| H04L 29/06 | (2006.01) |
| G06F 21/43 | (2013.01) |
| G06F 21/60 | (2013.01) |
| H04L 9/08 | (2006.01) |
| G06F 21/31 | (2013.01) |
| H04W 12/77 | (2021.01) |

(52) U.S. Cl.
CPC .......... *H04L 63/0853* (2013.01); *G06F 21/31* (2013.01); *G06F 21/43* (2013.01); *G06F 21/606* (2013.01); *H04L 9/0844* (2013.01); *H04L 63/18* (2013.01); *H04L 63/0428* (2013.01); *H04L 63/0869* (2013.01); *H04W 12/77* (2021.01)

(58) Field of Classification Search
CPC . G06F 21/31; H04L 63/0853; H04L 63/0428; H04L 63/0869
USPC ...................................................... 713/168
See application file for complete search history.

(56) References Cited

U.S. PATENT DOCUMENTS

| | | | |
|---|---|---|---|
| 7,995,196 B1* | 8/2011 | Fraser | G06K 9/00577 356/71 |
| 9,887,992 B1* | 2/2018 | Venkat | G06F 21/35 |
| 2011/0006110 A1* | 1/2011 | Cleary | G01N 21/25 235/375 |
| 2014/0131433 A1* | 5/2014 | Serhal | G06Q 20/28 235/375 |

(Continued)

OTHER PUBLICATIONS

Ahmed et al., "Privacy Preserving Web Based Transaction Using E-Smart Cards and Image Authentication", doi: 10.1109/ICACCE. 2015.60, 2015, pp. 465-470. (Year: 2015).*

*Primary Examiner* — Peter C Shaw
(74) *Attorney, Agent, or Firm* — Rosenberg, Klein & Lee

(57) ABSTRACT

User identities, password, etc. represent the barrier between a user's confidential data and any other third party seeking to access this data. As multiple software applications, web applications, web services, etc. embody this confidential data it is a tradeoff between easy recollection of said identities, passwords, etc. and data security. However, malware by intercepting user credentials provides third parties access to even complex passwords, user credentials, security keys etc. even where these are changed/updated regularly. Within the prior art substantial work has gone into addressing malware. However, in many instances the user is at or very near the computer with a software application executing a transaction requiring credentials/authorization with a portable electronic device or another device. Accordingly, it would be beneficial to provide users with an out-of-band communications channel for exchanging credentials and/or keys etc.

12 Claims, 15 Drawing Sheets

(56) References Cited

U.S. PATENT DOCUMENTS

| | | | |
|---|---|---|---|
| 2015/0227946 A1* | 8/2015 | Huang | G06Q 30/0185 235/462.25 |
| 2015/0379154 A1* | 12/2015 | Harris | G06K 7/10881 235/375 |
| 2016/0219039 A1* | 7/2016 | Houthooft | H04W 12/068 |

* cited by examiner

METHODS AND SYSTEMS FOR BLOCKING MALWARE ATTACKS

CROSS-REFERENCE TO RELATED APPLICATIONS

This application claims the benefit of priority from U.S. Provisional Patent Application Ser. No. 62/202,962 entitled "Methods and Systems for Blocking Malware" filed Aug. 10, 2015 and claims the benefit of priority from U.S. Provisional Patent Application 62/220,511 entitled "Methods and Systems for Blocking Malware Attacks" filed Sep. 18, 2015, the entire contents of which are incorporated herein by reference.

FIELD OF THE INVENTION

This invention relates to malware blocking and more particularly to automated, lightweight, and strongly authenticated methods of providing user credentials as part of user activities on workstations that prevent malware access to these user credentials.

BACKGROUND OF THE INVENTION

A password is a word or string of characters used for user authentication to prove identity or access approval to gain access to a resource, for example an access code is a type of password, which should be kept secret from those not allowed access. The use of passwords is known to be ancient. Sentries would challenge those wishing to enter an area or approaching it to supply a password or watchword, and would only allow a person or group to pass if they knew the password. In modern times, user names and passwords are commonly used by people during a process of a logging in (login) process that controls access to protected computer operating systems, including, but not limited to, mobile phones, cable TV decoders, computers, electronic banking, electronic mail, and automated teller machines (ATMs). A typical computer user has passwords for many purposes including but not limited to, logging into accounts, retrieving e-mail, accessing applications, databases, networks, web sites, and even reading the morning newspaper online.

Despite their name, there is no requirement for passwords to be actual words; indeed, passwords which are not actual words may be harder to guess, which is a desirable property, when trying to prevent unauthorized access to the resource(s) and/or data the password allows a user to access. Some passwords are formed from multiple words and may more accurately be called a passphrase. The term passcode is sometimes used when the secret information is purely numeric, such as the personal identification number (PIN) commonly used for ATM access. Passwords are generally short enough to be easily memorized and typed.

Many organizations specify a password policy that sets requirements for the composition and usage of passwords, typically dictating minimum length, required categories (e.g. upper and lower case, numbers, and special characters), prohibited elements (e.g. own name, date of birth, address, telephone number). Some governments have national authentication frameworks that define requirements for user authentication to government services, including requirements for passwords. However, despite such policies and in many other instances the password of an individual for a particular login will be something that they can easily remember. Today, in 2014, despite over twenty years of increasing penetration of the Internet, electronic devices, electronic resources, and systems the most common password is "123456" having recently unseated "password." Further, with passwords for a large number of electronic devices and systems it is also common for a user to repeat the same password with multiple devices and systems.

Hence, a third party by gathering personal data on a user may make a reasonable attempt at the password and where successful probably access multiple systems, resources, and data employed or relating to the user. This is, of course, if the user has not simply written it down next to their computer or on a note in their desk, office, home, car, etc. Not surprisingly, therefore there exist a series of applications that allow a user to store their passwords in a memory device and to retrieve them when needed. Typically, these applications fall into two categories. In the first, for increased security, the passwords are encoded and stored and access to the passwords is provided in response to user validation. However, the user still enters the password themselves once it is shown to them and accordingly, these applications are little more than a black book of passwords and actually not very convenient. In the second category, the device storing the password(s) is specific to the server being accessed and it therefore can provide a higher degree of security. However, such a system is either integrated with a server or specific to the server and/or solution installed.

However, malware, short for malicious software, includes software used to gather sensitive information, gain access to private computer systems, and in some instances execute fraudulent transactions exploiting the acquired sensitive information such as user account identities, passwords, challenge responses, credentials etc. Malware is defined by its malicious intent, acting against the requirements of the computer user, and does not include software that causes unintentional harm due to some deficiency. Malware may be stealthy, intended to steal information or spy on computer users for an extended period without their knowledge or it may be designed to cause harm, often as sabotage, or to extort payment. Such malware may include a variety of forms of hostile or intrusive software, including computer viruses, worms, trojan horses, ransomware, spyware, adware, scareware, and other malicious programs that can perform attacks on security systems such as man-in-the-middle attacks for example.

Accordingly, it would be beneficial to provide users as well as organizations providing/controlling access to systems, resources, and data to be provided with a means to entering password and/or security credential information in a manner that does not allow malware installed upon the electronic device executing the software application(s) the user wishes to access and/or exploit to intercept or acquire these credentials, passwords etc.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to address limitations within the prior art relating to malware blocking and more particularly to automated, lightweight, and strongly authenticated methods of providing user credentials as part of user activities on workstations that prevent malware access to these user credentials.

In accordance with an embodiment of the invention there is provided a method of verifying a transaction to be performed by a software application in execution upon an electronic device by establishing an encrypted mutually authenticated secure channel between the software application and a portable electronic device associated with a user establishing the transaction.

In accordance with an embodiment of the invention there is provided a method of verifying a transaction to be performed by a software application in execution upon an electronic device in dependence upon communications between the software application, a phone relay service, and a device associated with a user at least one of initiating and authorizing the transaction, wherein the initiator of the application is one of the user and the software application.

In accordance with an embodiment of the invention there is provided a method of verifying a transaction to be performed by a software application in execution upon an electronic device in dependence upon communications between the software application and a device associated with a user at least one of initiating and authorizing the transaction.

In accordance with an embodiment of the invention there is provided a method of verifying a transaction to be performed by a software application in execution upon an electronic device in dependence upon communications between the software application, a authentication server, and a device associated with a user at least one of initiating and authorizing the transaction, wherein the software application and device each only communicate with the authentication server.

In accordance with an embodiment of the invention there is provided a method of verifying a transaction to be performed by a software application in execution upon an electronic device in dependence upon communications between the software application, a credential injector agent in execution upon the electronic device, a authentication server, and a device associated with a user at least one of initiating and authorizing the transaction, wherein the software application communicates only with the credential injector agent and the credential injector agent and device each only communicate with the authentication server.

In accordance with an embodiment of the invention there is provided a method of verifying a transaction to be performed by a software application in execution upon an electronic device in dependence upon communications between the electronic device, a credential injector agent in execution upon the electronic device, a authentication server, and a device associated with a user at least one of initiating and authorizing the transaction, wherein all communications are routed through the credential injector agent and the credential injector agent communicates with the authentication server, the software application, and the device.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
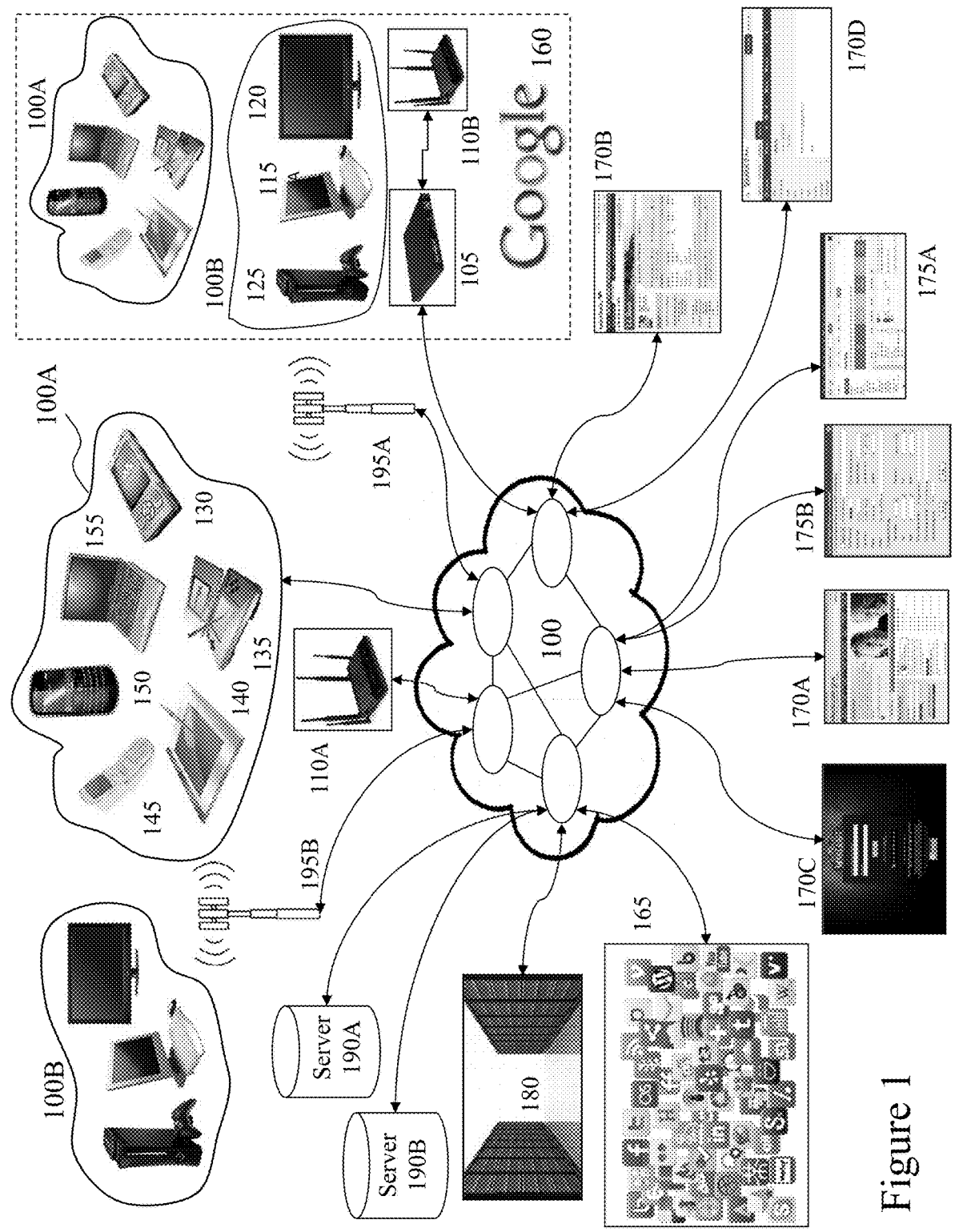
FIG. 1 depicts a network environment within which embodiments of the invention may be employed.

The present invention is directed to malware blocking and more particularly to automated, lightweight, and strongly authenticated methods of providing user credentials as part of user activities on workstations that prevent malware access to these user credentials.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "social network" or "social networking service" as used herein may refer to, but is not limited to, a platform to build social networks or social relations among people who may, for example, share interests, activities, backgrounds, or real-life connections. This includes, but is not limited to, social networks such as U.S. based services such as Facebook, Google+, Tumblr and Twitter; as well as Nexopia, Badoo, Bebo, VKontakte, Delphi, Hi5, Hyves, iWiW, Nasza-Klasa, Soup, Glocals, Skyrock, The Sphere, StudiVZ, Tagged, Tuenti, XING, Orkut, Mxit, Cyworld, Mixi, renren, weibo and Wretch.

"Social media" or "social media services" as used herein may refer to, but is not limited to, a means of interaction among people in which they create, share, and/or exchange information and ideas in virtual communities and networks. This includes, but is not limited to, social media services relating to magazines, Internet forums, weblogs, social blogs, microblogging, wikis, social networks, podcasts, photographs or pictures, video, rating and social bookmarking as well as those exploiting blogging, picture-sharing, video logs, wall-posting, music-sharing, crowdsourcing and voice over IP, to name a few. Social media services may be classified, for example, as collaborative projects (for example, Wikipedia); blogs and microblogs (for example, Twitter™); content communities (for example, YouTube and DailyMotion); social networking sites (for example, Facebook™); virtual game-worlds (e.g., World of Warcraft™); and virtual social worlds (e.g. Second Life™).

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A 'third party' or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals who by their engagement with a service provider, third party provider, enterprise, social network, social media etc. via a dashboard, web service, website, software plug-in, software application, graphical user interface accesses, for example, electronic content and/or an electronic service. This includes, but is not limited to, private individuals, employees of organizations and/or enterprises, members of community organizations, members of charity organizations, men, women, children, and teenagers. In its broadest sense the user may further include, but not be limited to, software systems, mechanical systems, robotic systems, android systems, etc. that may be characterised by accessing, for example, electronic content and/or an electronic service.

"User information" as used herein may refer to, but is not limited to, user behavior information and/or user profile information. It may also include a user's biometric information, an estimation of the user's biometric information, or a projection/prediction of a user's biometric information derived from current and/or historical biometric information.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http:// en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

Reference to "content information" as used herein may refer to, but is not limited to, any combination of content features, content serving constraints, information derivable from content features or content serving constraints (referred to as "content derived information"), and/or information related to the content (referred to as "content related information"), as well as an extension of such information (e.g., information derived from content related information).

Reference to a "document" as used herein may refer to, but is not limited to, any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.). In the context of the Internet, a common document is a Web page. Web pages often include content and may include embedded information (such as meta-information, hyperlinks, etc.) and/or embedded instructions (such as Javascript, etc.). In many cases, a document has a unique, addressable, storage location and can therefore be uniquely identified by this addressable location such as a universal resource locator (URL) for example used as a unique address used to access information on the Internet.

"Document information" as used herein may refer to, but is not limited to, may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Referring to FIG. 1 there is depicted a network environment 100 within which embodiments of the invention may be employed supporting password systems and/or password applications/providers (PSPAPs) according to embodiments of the invention. Such PSPAPs, for example support the provisioning of data to a user, e.g. electronic mail, the provisioning of services, e.g. online banking, online retail, etc., as well as other personal and work related resources, systems, data, etc. As shown first and second user groups 100A and 100B respectively interface to a telecommunications network 100. Within the representative telecommunication architecture, a remote central exchange 180 communicates with the remainder of a telecommunication service providers network via the network 100 which may include for example long-haul OC-48/OC-192 backbone elements, an OC-48 wide area network (WAN), a Passive Optical Network, and a Wireless Link. The central exchange 180 is connected via the network 100 to local, regional, and international exchanges (not shown for clarity) and therein through network 100 to first and second cellular APs 195A and 195B respectively which provide Wi-Fi cells for first and second user groups 100A and 100B respectively. Also connected to the network 100 are first and second Wi-Fi nodes 110A and 110B, the latter of which being coupled to network 100 via router 105. Second Wi-Fi node 110B is associated with Enterprise 160, e.g. Google™, within which other first and second user groups 100A are and 100B. Second user group 100B may also be connected to the network 100 via wired interfaces including, but not limited to, DSL, Dial-Up, DOCSIS, Ethernet, G.hn, ISDN, MoCA, PON, and Power line communication (PLC) which may or may not be routed through a router such as router 105.

Within the cell associated with first AP 110A the first group of users 100A may employ a variety of PEDs including for example, laptop computer 155, portable gaming console 135, tablet computer 140, smartphone 150, cellular telephone 145 as well as portable multimedia player 130. Within the cell associated with second AP 110B are the second group of users 100B which may employ a variety of FEDs including for example gaming console 125, personal computer 115 and wireless/Internet enabled television 120 as well as cable modem 105. First and second cellular APs 195A and 195B respectively provide, for example, cellular GSM (Global System for Mobile Communications) telephony services as well as 3G and 4G evolved services with enhanced data transport support. Second cellular AP 195B provides coverage in the exemplary embodiment to first and second user groups 100A and 100B. Alternatively the first and second user groups 100A and 100B may be geographically disparate and access the network 100 through multiple APs, not shown for clarity, distributed geographically by the network operator or operators. First cellular AP 195A as show provides coverage to first user group 100A and environment 170, which comprises second user group 100B as well as first user group 100A. Accordingly, the first and second user groups 100A and 100B may according to their particular communications interfaces communicate to the network 100 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-1000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly, portable electronic devices within first user group 100A may form associations either through standards such as IEEE 802.15 and Bluetooth as well in an ad-hoc manner.

Also connected to the network 100 are Social Networks (SOCNETS) 165, such as Facebook™, LinkedIn™, first and second services 170A and 170B respectively, e.g. US Medicare.GOV and Bank of America™, online gaming website 170C, e.g. World of Warcraft™, cloud based email service 170D, e.g. Yahoo!™, customer resource management 175A, e.g. Streak CRM for Google Cloud, and digital document signature function 175, e.g. Adobe™ Acrobat, as well as first and second servers 190A and 190B which together with others, not shown for clarity. First and second servers 190A and 190B may host according to embodiments of the inventions multiple services associated with a provider of password systems and password applications/providers (PSPAPs); a provider of a SOCNET or Social Media (SOME) exploiting PSPAP features; a provider of a SOCNET and/or SOME not exploiting PSPAP features; a provider of services to PEDS and/or FEDS; a provider of one or more aspects of wired and/or wireless communications; an Enterprise 160 exploiting PSPAP features; license databases; content databases; image databases; content libraries; customer databases; websites; and software applications for download to or access by FEDs and/or PEDs exploiting and/or hosting PSPAP features. First and second primary content servers 190A and 190B may also host for example other Internet services such as a search engine, financial services, third party applications and other Internet based services.

Accordingly, a consumer and/or customer (CONCUS) may exploit a PED and/or FED within an Enterprise 160, for example, and access one of the first or second primary content servers 190A and 190B respectively to perform an operation such as accessing/downloading an application which provides PSPAP features according to embodiments of the invention; execute an application already installed providing PSPAP features; execute a web based application providing PSPAP features; or access content. Similarly, a CONCUS may undertake such actions or others exploiting embodiments of the invention exploiting a PED or FED within first and second user groups 100A and 100B respectively via one of first and second cellular APs 195A and 195B respectively and first Wi-Fi nodes 110A.

Figure 2:
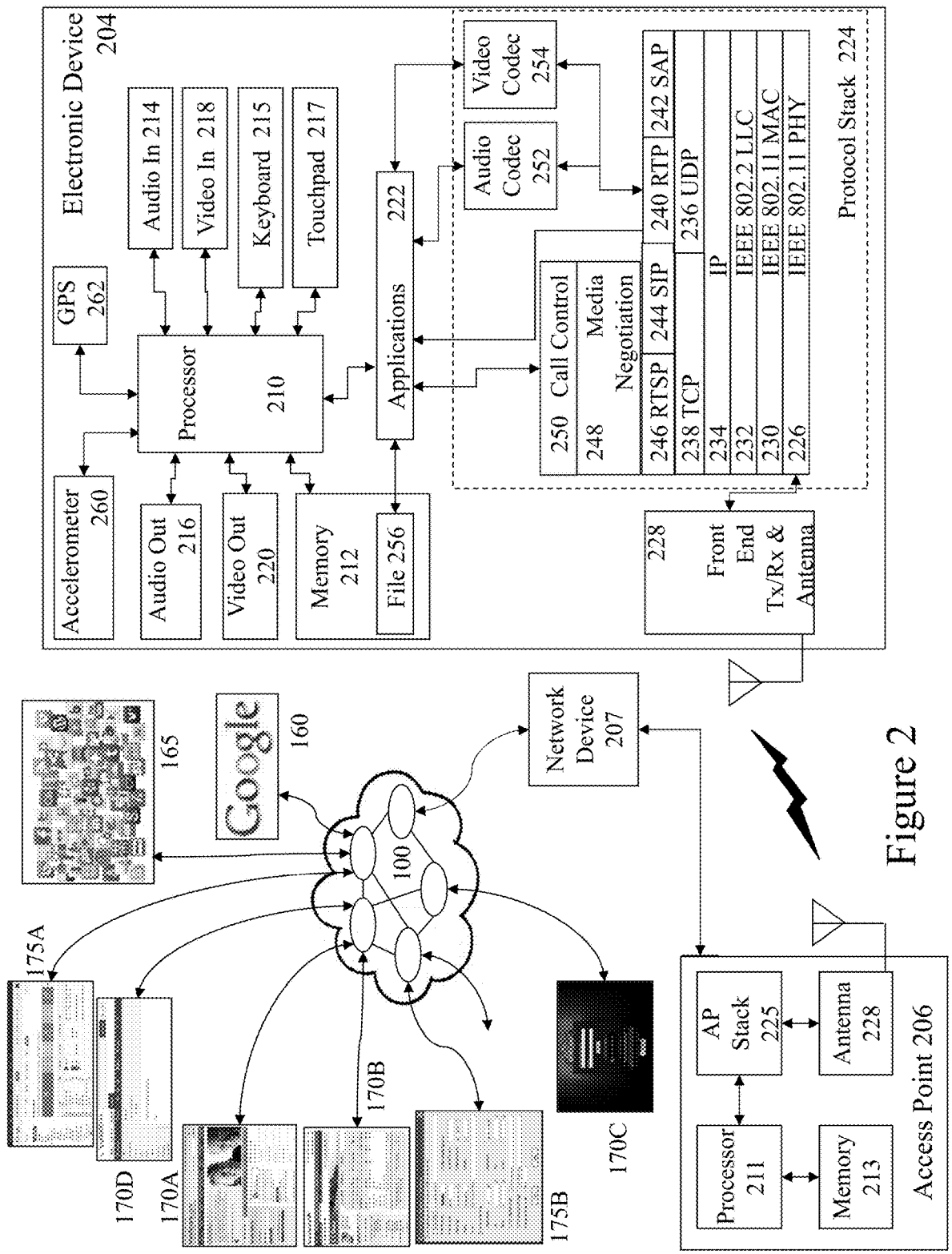
FIG. 2 depicts a wireless portable electronic device supporting communications to a network such as depicted in FIG. 1 and as supporting embodiments of the invention.

Now referring to FIG. 2 there is depicted an electronic device 204 and network access point 207 supporting PSPAP features according to embodiments of the invention. Electronic device 204 may, for example, be a PED and/or FED and may include additional elements above and beyond those described and depicted. Also depicted within the electronic device 204 is the protocol architecture as part of a simplified functional diagram of a system 200 that includes an electronic device 204, such as a smartphone 155, an access point (AP) 206, such as first AP 110, and one or more network devices 207, such as communication servers, streaming media servers, and routers for example such as first and second servers 190A and 190B respectively. Network devices 207 may be coupled to AP 206 via any combination of networks, wired, wireless and/or optical communication links such as discussed above in respect of FIG. 1 as well as directly as indicated. Network devices 207 are coupled to network 100 and therein Social Networks (SOCNETS) 165, such as Facebook™, LinkedIn™, first and second services 170A and 170B respectively, e.g. US Medicare.GOV and Bank of America™, online gaming website 170C, e.g. World of Warcraft™, cloud based email service 170D, e.g. Yahoo!™, customer resource management 175A, e.g. Streak CRM for Google Cloud, and digital document signature function 175, e.g. Adobe™ Acrobat, The electronic device 204 includes one or more processors 210 and a memory 212 coupled to processor(s) 210. AP 206 also includes one or more processors 211 and a memory 213 coupled to processor(s) 210. A non-exhaustive list of examples for any of processors 210 and 211 includes a central processing unit (CPU), a digital signal processor (DSP), a reduced instruction set computer (RISC), a complex instruction set computer (CISC) and the like. Furthermore, any of processors 210 and 211 may be part of application specific integrated circuits (ASICs) or may be a part of application specific standard products (ASSPs). A non-exhaustive list of examples for memories 212 and 213 includes any combination of the following semiconductor devices such as registers, latches, ROM, EEPROM, flash memory devices, nonvolatile random access memory devices (NVRAM), SDRAM, DRAM, double data rate (DDR) memory devices, SRAM, universal serial bus (USB) removable memory, and the like.

Electronic device 204 may include an audio input element 214, for example a microphone, and an audio output element 216, for example, a speaker, coupled to any of processors 210. Electronic device 204 may include a video input element 218, for example, a video camera or camera, and a video output element 220, for example an LCD display, coupled to any of processors 210. Electronic device 204 also includes a keyboard 215 and touchpad 217 which may for example be a physical keyboard and touchpad allowing the user to enter content or select functions within one of more applications 222. Alternatively, the keyboard 215 and touchpad 217 may be predetermined regions of a touch sensitive element forming part of the display within the electronic device 204. The one or more applications 222 that are typically stored in memory 212 and are executable by any combination of processors 210. Electronic device 204 also includes accelerometer 260 providing three-dimensional motion input to the process 210 and GPS 262 which provides geographical location information to processor 210.

Electronic device 204 includes a protocol stack 224 and AP 206 includes a communication stack 225. Within system 200 protocol stack 224 is shown as IEEE 802.11 protocol stack but alternatively may exploit other protocol stacks such as an Internet Engineering Task Force (IETF) multimedia protocol stack for example. Likewise, AP stack 225 exploits a protocol stack but is not expanded for clarity. Elements of protocol stack 224 and AP stack 225 may be implemented in any combination of software, firmware and/or hardware. Protocol stack 224 includes an IEEE 802.11-compatible PHY module 226 that is coupled to one or more Front-End Tx/Rx & Antenna 228, an IEEE 802.11-compatible MAC module 230 coupled to an IEEE 802.2-compatible LLC module 232. Protocol stack 224 includes a network layer IP module 234, a transport layer User Datagram Protocol (UDP) module 236 and a transport layer Transmission Control Protocol (TCP) module 238.

Protocol stack 224 also includes a session layer Real Time Transport Protocol (RTP) module 240, a Session Announcement Protocol (SAP) module 242, a Session Initiation Protocol (SIP) module 244 and a Real Time Streaming Protocol (RTSP) module 246. Protocol stack 224 includes a presentation layer media negotiation module 248, a call control module 250, one or more audio codecs 252 and one or more video codecs 254. Applications 222 may be able to create maintain and/or terminate communication sessions with any of devices 207 by way of AP 206. Typically, applications 222 may activate any of the SAP, SIP, RTSP, media negotiation and call control modules for that purpose. Typically, information may propagate from the SAP, SIP, RTSP, media negotiation and call control modules to PHY module 226 through TCP module 238, IP module 234, LLC module 232 and MAC module 230.

It would be apparent to one skilled in the art that elements of the electronic device 204 may also be implemented within the AP 206 including but not limited to one or more elements of the protocol stack 224, including for example an IEEE 802.11-compatible PHY module, an IEEE 802.11-compatible MAC module, and an IEEE 802.2-compatible LLC module 232. The AP 206 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed electronic devices represented by electronic device 204 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

Figure 3:
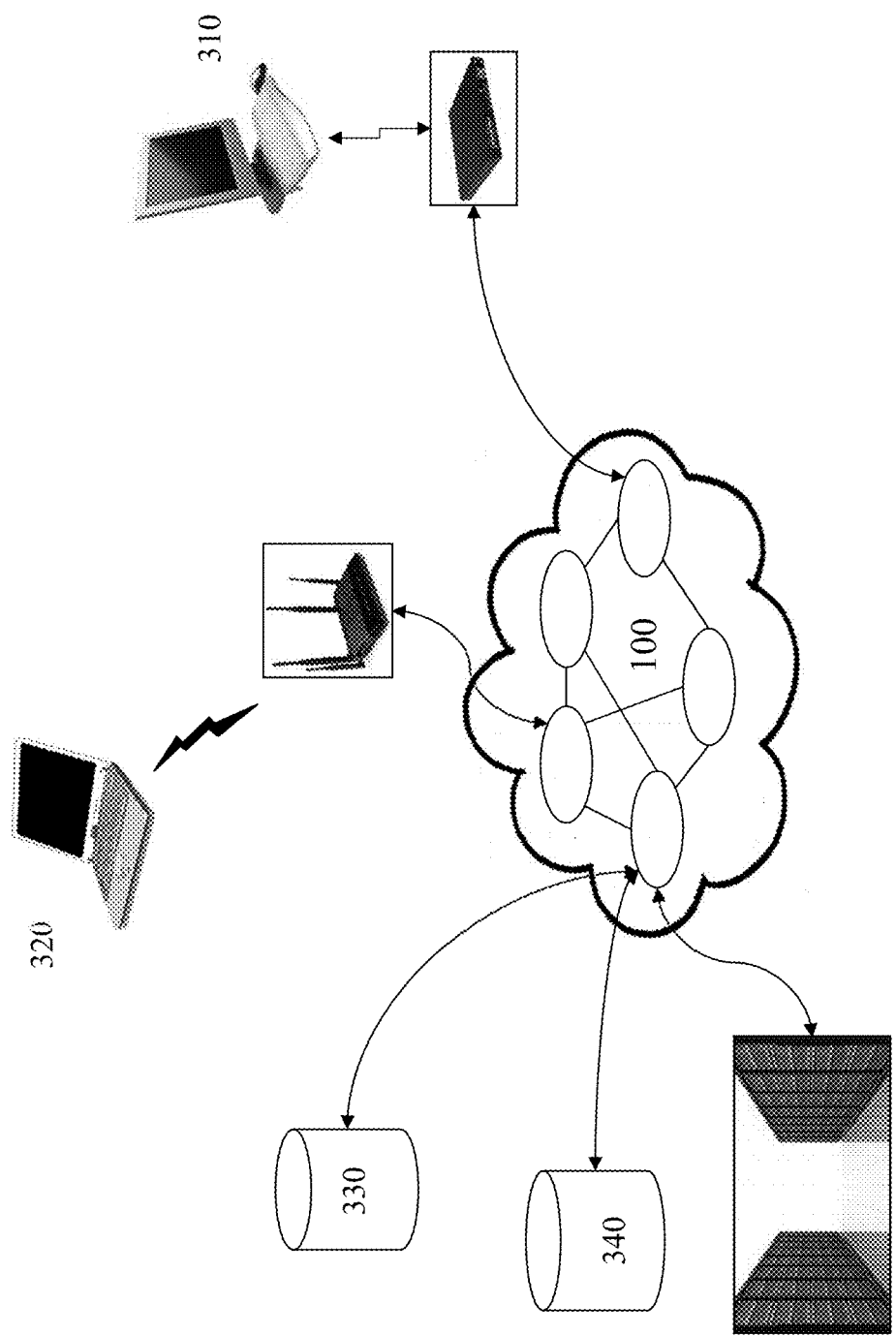
FIG. 3 depicts a simplified network environment within which embodiments of the invention may be employed.

According, referring to FIG. 3 there is depicted a simplified network diagram within which the embodiments of the invention are referenced. However, it would be evident to one skilled in the art that the embodiments are applicable to the more generalized network, servers, services, databases, PEDs, FEDs, etc. described supra in respect of FIGS. 1 and 2. Accordingly, a wide area network, e.g. the Internet, is depicted as network 100 with a first computer system 310, e.g. PED or FED such as laptop 155, and a second computer system 320, e.g. PED or FED such as personal computer 115, in communication therewith together with first and second servers 330 and 340 respectively, e.g. first and second servers 190A and 190B respectively in FIG. 1. The communication network supports communication between the first computer system 310 and the first server 330, between the first computer system 310 and the second server 340, between the second computer system 320 and the first server 330, and between the second computer system 320 and the second server 340. Further, more complex communications are possible such as from the first computer system 310 to the first server 330 and then to the second computer system 320. Of course, the first computer system 310 is able to communicate with the second computer system 320 as well, though this is less commonly direct.

Figure 4:
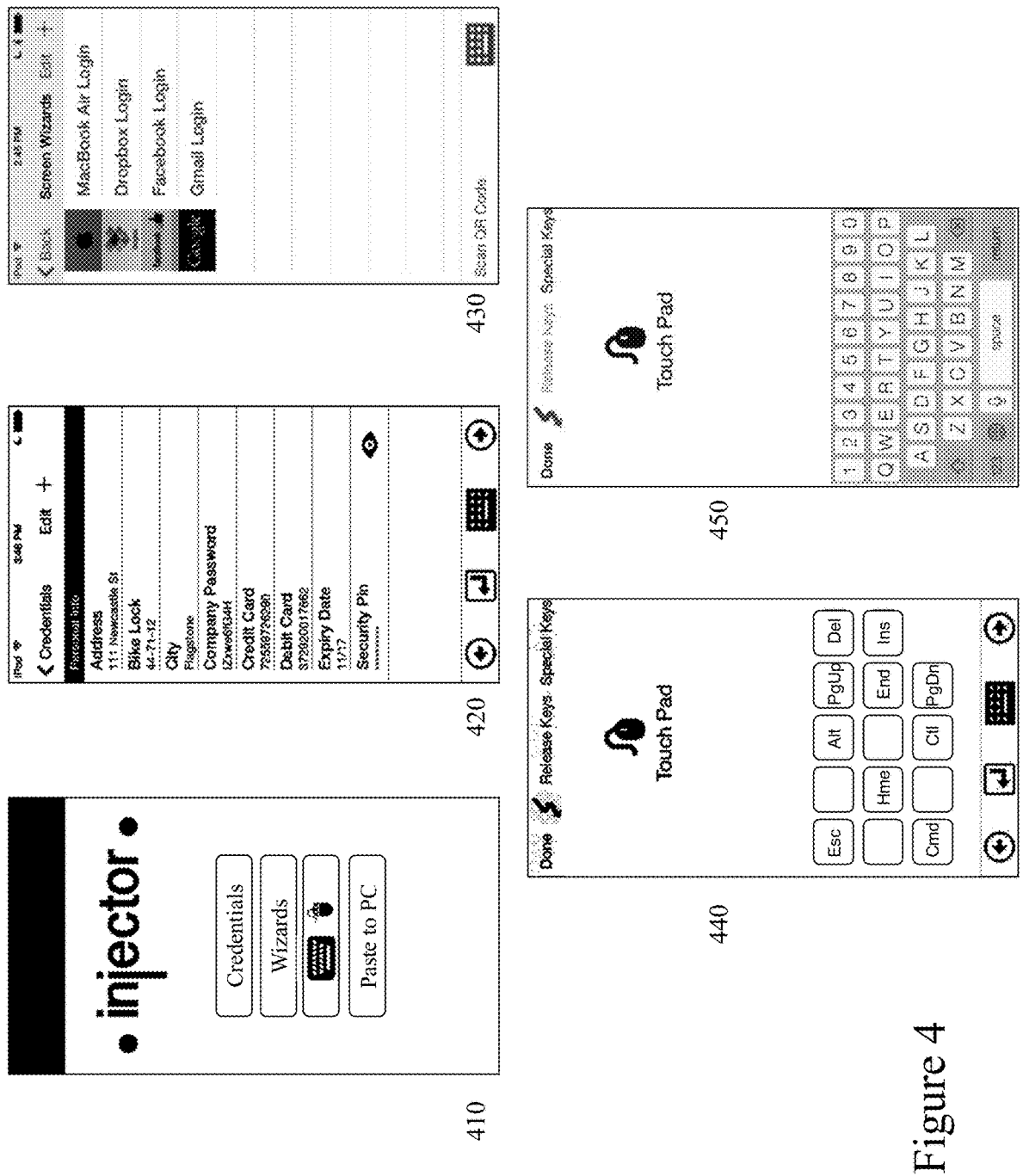
FIG. 4 depicts exemplary screen images from a PSPAP according to an embodiment of the invention.

Now referring to FIG. 4 there are depicted first to fifth exemplary screen images 410 to 450 for a PSPAP according to an embodiment of the invention. First screen image 410 presents a menu screen to a user allowing them to select different functional options, such as:
 "Credentials" which links the user to second screen image 420 with a list of elements and their values that have been stored within the PSPAP;
 "Wizards" which links the user to third screen image 430 that provides automated functions for the user, such as depicted with automated logins for MacBook Air, Dropbox, Facebook, and Gmail;
 "Keyboard-Mouse" which links the user to third screen image 440 and therefrom by selection of the keyboard icon on the bottom of third screen image 440 with fourth screen image 450, wherein third screen image 440 provides the user with the ability using a touchscreen on their PED to move their finger and mimic to the computer system movement of a mouse together with specific mouse/keyboard functions whilst fifth screen image 450 presents the user with keyboard on their PED such that as they type the PSPAP mimics a keyboard to the computer system.

Wizards are beneficial to users for web site form filling and logins. Typically, a PSPAP will be able to access downloadable wizard templates for the user to choose from. Each wizard template contains place holders for credential items that the user selects from their credential sets and the wizard will automatically use those items whenever it is executed. Optionally the user may also manually execute a wizard to perform a web login or form fill by placing the cursor over the first input field and then tapping on the desired PSPAP wizard. The PSPAP wizard then proceeds to complete the web login or form fill moving from field to field and filling them in with the referenced credential items. Alternatively, a user may access one or more PSPAP browser extensions/plug-ins such as described below and depicted in FIG. 23 allowing the user to select a recognized input field, trigger a popup of a QR code, and then subsequently scan the QR code with their PED and the PSPAP will automatically find the correct PSPAP wizard for that page and execute it.

Figure 5:
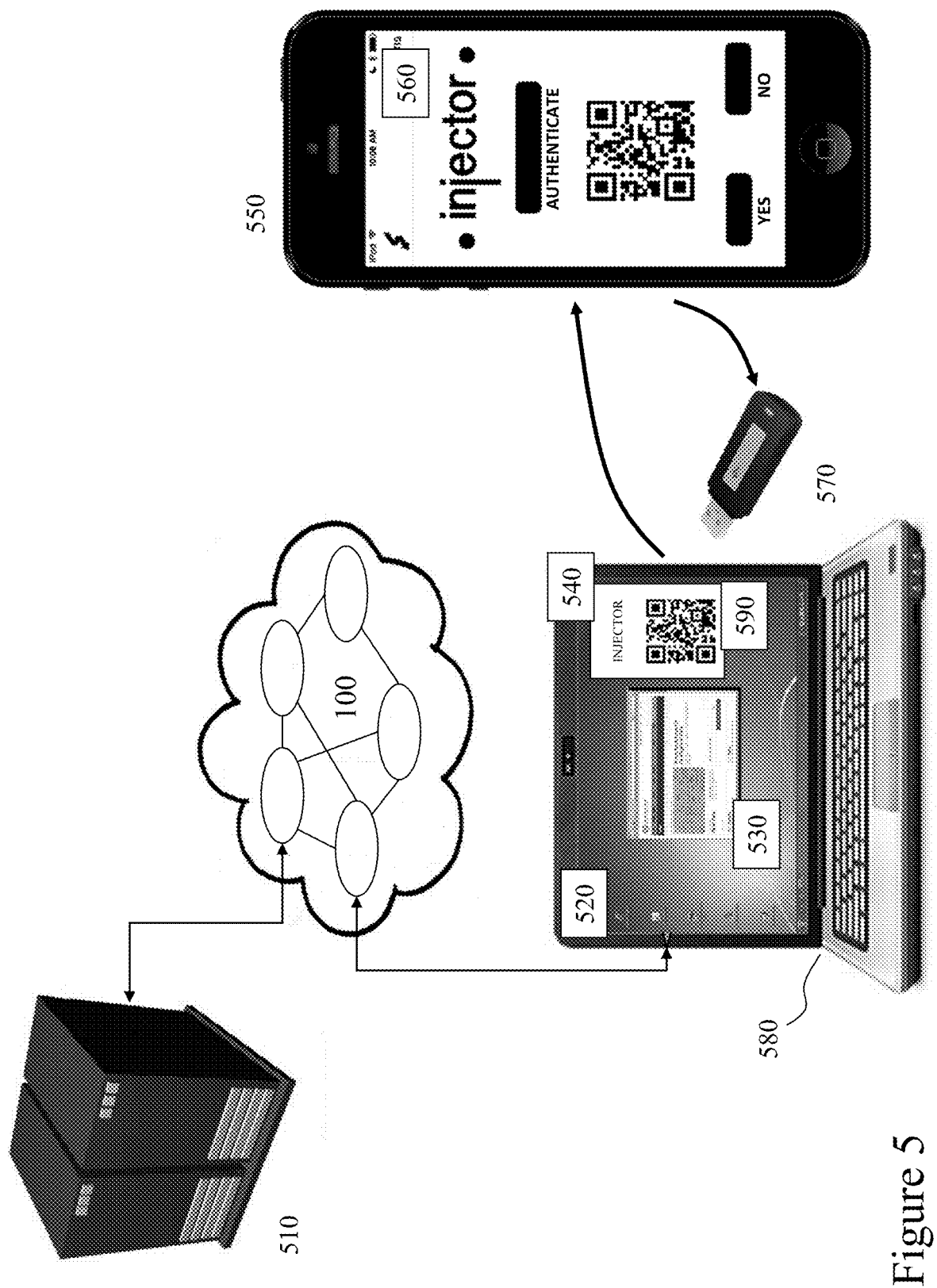
FIG. 5 depicts a simplified diagram showing an authentication method according to an embodiment of the invention for responding to a challenge issued by a remote authentication server.

Now referring to FIG. 5 there is depicted a simplified diagram showing an authentication method according to an embodiment of the invention for responding to a challenge issued by a remote authentication server. Accordingly, a user as part of an activity 530, e.g. a financial transaction, online purchase, etc., within a web browser or user interface 520 is provided with a challenge from a server 510 which is received at the user's computer system 580, e.g. their FED or PED. A PSPAP plug-in 540 upon the user's computer system 580 captures the authentication request and converts this to a QR code 590. The user then can capture the QR code 590 upon a PSPAP application in execution upon their PED 550 wherein the user is then presented with authentication screen 560 giving them button options to authenticate or not. If the decision is to authenticate then the PSPAP transmits to a USB device 570 attached to the user's computer system 580 the authentication code which is then provided back via user's computer system 580 to the server 510 authenticating the activity. In some instances, the challenge may request additional information in addition to the basic authentication code(s) wherein this requirement would also be captured and embedded within the QR Code 590, retrieved by the PSPAP or entered by the user and transmitted with the base authentication information to the USB device 570.

Optionally, the PSPAP plug-may, to prevent spoofing, add additional content to the QR code 590 wherein the additional content is known only by the PSPAP plug-in and the PSPAP upon the user's device. Accordingly, the PSPAP upon the user's device can verify that the QR code 590 comprises visual code data generated in dependence upon the request from a trusted entity and is not being replayed or spoofed. The additional content may include, but not limited to, a digital signature, a one-time password, and a digital representation of a signature.

Accordingly, it would be evident that an embodiment of the invention such as described and depicted in respect of FIG. 5 exploiting QR codes may be employed as part of registration and/or authentication challenges such as those arising within evolving/emerging standards and proposed standards for reducing the reliance on passwords to authenticate users including for example, but not limited to, the FIDO Alliance's Universal Authentication Framework (UAF) protocol and Universal Second Factor (U2F) protocol.

Accordingly, considering a registration process compliant to the FIDO Alliance U2F specifications, which are drafted for exploiting a FIDO device then we have the following sequence (A1) to (A3):
 (A1) Relying party creates challenge information for the FIDO device to respond to;
 (A2) FIDO device digitally signs the challenge and sends it back along with other registration data; and (A3) Relying party validates signature and authenticity of the device and registers a key for the user (from registration data).

Now this registration process using a PSPAP and USB device this process becomes the following sequence (B1) to (B7:
(B1) Relying party creates challenge information for the FIDO device to respond to;
(B2) PSPAP plug-in captures challenge and generates/displays QR code;
(B3) User captures image of QR code and PSPAP decodes to determine that challenge issued;
(B4) PSPAP sends required data, e.g. signed challenge, to USB device to generate response to challenge and also sends any other required registration data;
(B5) FIDO device digitally signs the challenge and sends it back along with other registration data;
(B6) USB device sends signed challenge to relying party together with other required registration data; and
(B7) Relying party validates signature and authenticity of the device and registers a key for the user (from registration data).

It would be evident that in a similar manner that the authentication of a user using a process compliant to FIDO Alliance U2F process would be implemented as the following sequence (C1) to (C7):
(C1) Relying party creates challenge information for the FIDO device to respond to;
(C2) PSPAP plug-in captures challenge and generates/displays QR code;
(C3) User captures image of QR code and PSPAP decodes to determine that challenge issued;
(C4) PSPAP sends required data, e.g. signed challenge, to USB device to generate response to challenge and also sends any other required registration data;
(C5) FIDO device digitally signs the challenge and sends it back along with other registration data;
(C6) USB device sends signed challenge to relying party together with other required registration data; and
(C7) Relying party validates signature.

Within embodiments of the invention presented supra reference is made in respect of some figures and descriptions to the use of QR codes to allow a user's PED to capture web login or form fill information. However, as evident from other sections of the specification a QR code is one code format of a range of possible code formats. Hence it would be evident to one skilled I the art that in these embodiments, e.g. FIGS. 4 to 5, that the QR code may be replaced within another barcode/code format.

Figure 6:
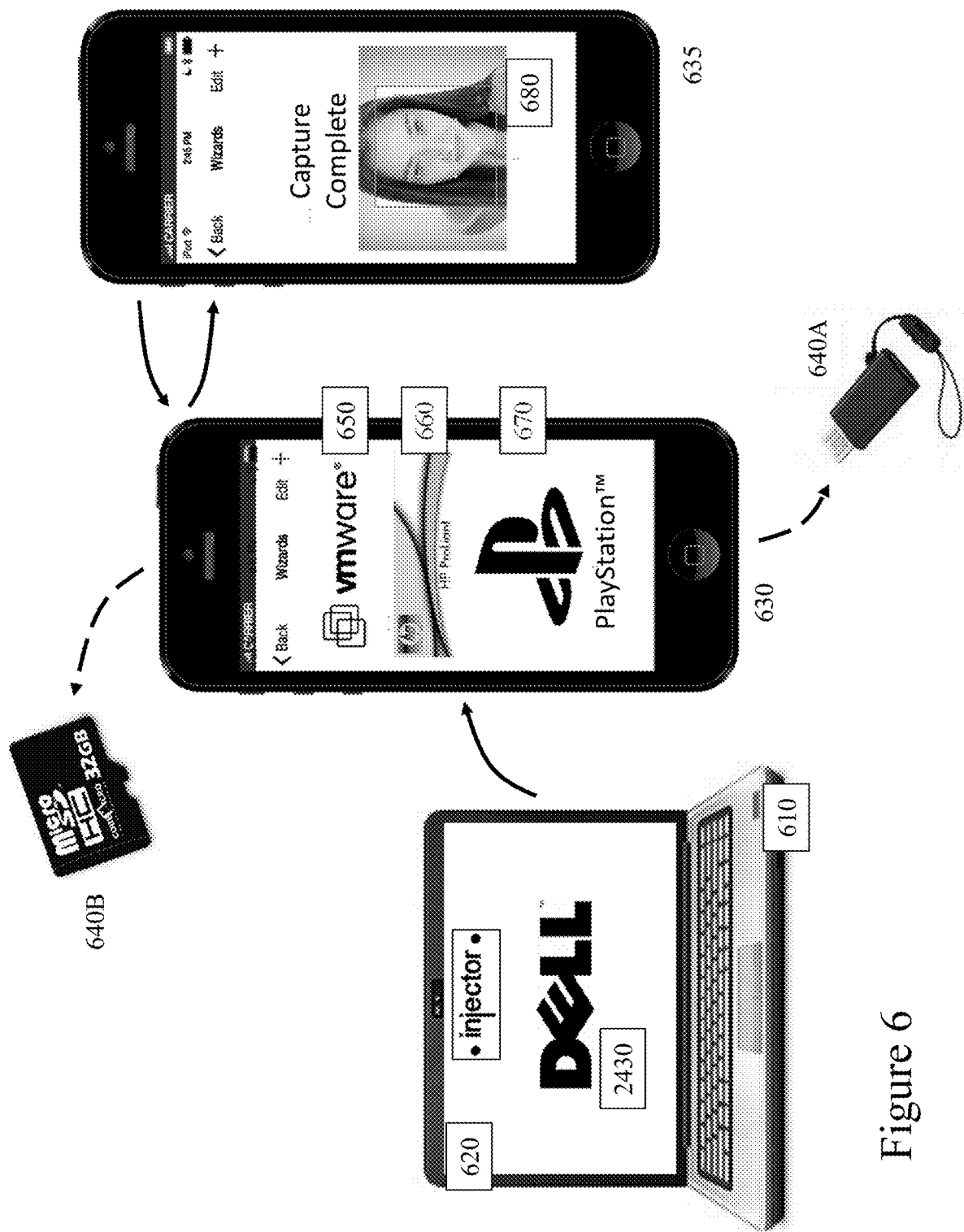
FIG. 6 depicts unlocking of a secure electronic memory device from a PSPAP according to an embodiment of the invention.

Within embodiments of the invention presented below user credentials, the PSPAP, etc. from the user's side are primarily described and discussed as being stored within their PED/FED. However, the credentials etc. may be stored within a memory device which is interfaced to the user's PED/FED either as part of the PED/FED or connected to an interface of the PED/FED through Wi-Fi, USB etc. or SIM connector, memory card connector (e.g. microSDHC or microSD), and receiving and/or providing data and/or communications to/from a user's PED/FED. Optionally, in such scenarios such as depicted in FIG. 6, a microUSB memory device 640A or microSDHC card 640B, for example, may be locked such that it is only upon receipt of appropriate authorisation/credentials, for example, that the memory device can provide data to the PED/FED, e.g. laptop 610, to which it is connected. This appropriate authorisation or provisioning of appropriate credentials being provided by a PED 630 to which the memory device, e.g. a microUSB memory device 640A or microSDHC card 640B, communicates via a connectorised interface or optionally through a local and/or personal area wireless network, such as Bluetooth, Zigbee, etc. Accordingly, the memory device, e.g. a microUSB memory device 640A or microSDHC card 640B, may take power from the PED/FED but otherwise is inaccessible to the PED/FED unless the appropriate authorisation/credentials have been acquired. Optionally, the memory device, e.g. a microUSB memory device 640A or microSDHC card 640B, may comprise a battery such that the memory device does not draw power from the PED/FED until the appropriate authorisation/credentials have been acquired. Optionally, the memory device 640 may wirelessly communicate to the PED/FED, e.g. PED 630, even though it draws power from the PED/FED, e.g. PED 630.

Within the prior art unlocking a removable storage device, i.e. a USB flash drive requires a password to unlock, it is necessary to run software on the host computer in order to unlock the drive as a password dialog is required. Accordingly, USB storage vendors today try to work around this by having multiple drives partitioned, of one is "read-only" and contains the software required to launch the password dialog and unlock the other drive partitioned onto the USB device so that this is locked and inaccessible until unlocked. However, in doing so these vendors must also communicate with the USB devices to send "unlock" commands in a manner that does not violate operating system restrictions. This can be difficult enough but the situation becomes even worse where the PED/FED is being booted using a portable operating system (OS) stored on the USB device. This arises as it is now necessary to initially boot the machine into a "pre-boot" environment in order to allow entry of the password after which the PED/FED can be "re-booted" with the portable OS. In contrast, embodiments of the invention circumvent this as the PED 630 can unlock the Memory device without requiring any pre-boot of the PED/FED onto which the portable OS is being installed. Within environments where increased security is required, e.g. no wireless communications, then a direct connection may be employed such that the communications from PED 630 are through a wired interface or through an audio interface such as described by the inventors in U.S. patent application Ser. No. 14/662,850 filed Mar. 19, 2015 entitled "Methods and Systems for Data Entry".

As depicted in FIG. 6 the PED 630 is depicted as allowing the unlocking of multiple OS, depicted as first to third OS 650 to 670 respectively. Optionally, these may be separate partitioned drives within the USB to audio conversion assembly 400 or Memory device. In addition to supporting remote unlocking embodiments of the invention provide for additional biometric and/or credential provisioning in order to unlock a memory, drive, etc. above and beyond a password such as depicted within FIG. 6 wherein selection of an OS, one of first to third OS 650 to 670 respectively, a facial recognition application 680 is launched as depicted upon PED image 635 requiring facial recognition of a recognized authorized user in order to unlock the selected OS. In some embodiments of the invention the facial recognition application 680 may be an already installed feature of the PED 630 or it may form part of the software according to embodiments of the invention or separately loaded and accessed. It would be evident to one skilled in the art that other biometric data may be employed including, but not limited to, vocal characteristics, fingerprint, retinal image, etc. either discretely or in combination. Optionally, the one of the first to third OS 650 to 670 respectively is established in dependence upon the identity of the user authorised upon the PED. For example, a first user, e.g. an adult, triggers booting of the PED/FED into a computer operating system, e.g. Microsoft™ Windows, whilst a second user, e.g. a child, triggers booting of the PED/FED into a gaming operating system, e.g. Nintendo™ Play Station™. Optionally, a memory device may be partitioned such that the partition or drives within the memory device accessible to the PED/FED vary according to the identity of the authorized user.

However, in some instances the credential management through aspects such as passwords, facial recognition, etc. may not be sufficient as access is required to be limited physically, i.e. geographically, in addition to individually. Accordingly, an enterprise may wish to have corporate managed credentials on an employee's PED such that they can be restricted for use only from certain locations only. For example, an enterprise may wish to enforce a Virtual Private Network (VPN) login policy such that a valid login can only be made from the enterprise's office or from the authorized individual's home location. With the ability to exploit geolocation features within the PED then the policy enforcement is performed within the same PED and the other processes. Accordingly, the PED geolocation provides for policy enforcement which is than exploiting prior art schemes such as IP whitelisting schemes.

Figure 7:
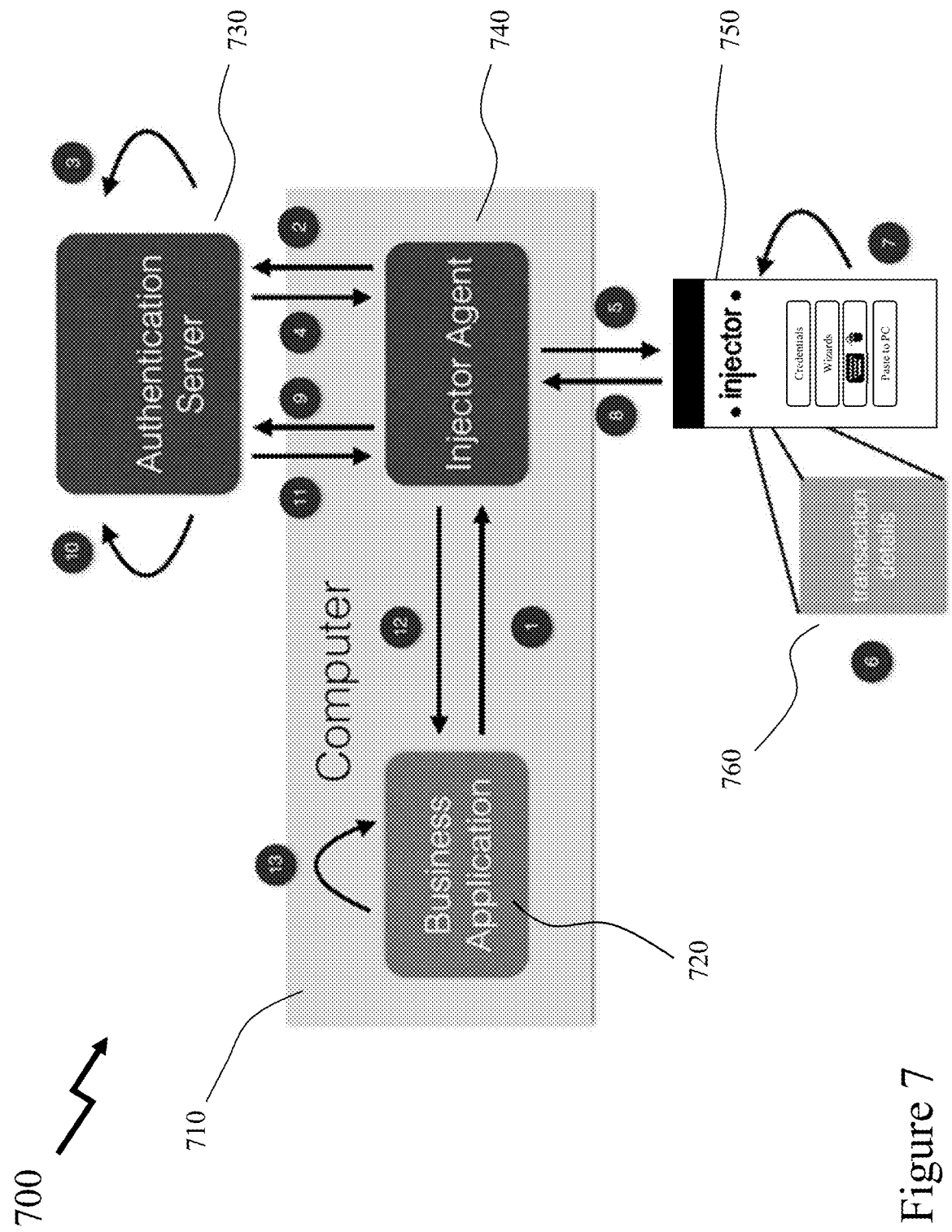
FIG. 7 depicts a secure workflow process for providing user credentials without exposing them to malware according to an embodiment of the invention.

Referring to FIG. 7 there is depicted a secure workflow process 700 for providing user credentials without exposing them to malware according to an embodiment of the invention wherein the credentials are employed by a business application (BUSAP) 720 in execution upon a computer 710, for example a FED and/or PED, wherein a PSPAP agent 740 has been installed on the computer 710. The PSPAP agent 740 communicates with a PSPAP installed upon a user's PED 750 and a Universal $2^{nd}$ Factor (U2F) Authentication Server (U2FAS) 730, which may be local and/or remote via network 100 or networks not shown for clarity. Accordingly, the secure workflow process 700 proceeds via steps 1 to 13 which comprise:

1. Request authorization, wherein the BUSAP 720 wishes to obtain authorization for a transaction and communicates to the PSPAP agent 740;
2. Hashed transaction details, wherein the PSPAP agent 740 transmits a hashed copy of the transaction details to the U2FAS 730;
3. Create authentication challenge; wherein the U2FAS 730 creates an authentication challenge;
4. Return authentication request; wherein the U2FAS 730 communicates the authentication challenge to the PSPAP agent 740 as a return authentication request;
5. Send request to PED; wherein the PSPAP agent 740 sends the authentication challenge to the user's PED 750;
6. Ask for user consent; wherein the PSPAP in execution upon the user's PED 750 provides the user with transaction details 760 and a request for user consent;
7. Sign authentication challenge; wherein the user signs the authentication challenge within the PSPAP if they confirm the transaction details 760;
8. Return authentication response; wherein the PSPAP, based upon the user's signing of the transaction details 760 associated with the authentication challenge, returns the user's authentication response to the authentication challenge to the PSPAP agent 740;
9. Send response for verification; wherein the PSPAP agent 740 transmits the received authentication response to the authentication challenge to the U2FAS 730;
10. Verity response; wherein the U2FAS 730 verifies the received authentication response to the authentication challenge it issued;
11. Return signed server response; wherein upon a valid authentication response to the authentication challenge the U2FAS 730 transmits to the PSPAP agent 740 a signed server response authorizing the transaction;
12. Send result to application; wherein the PSPAP agent 740 sends the BUSAP 720 the response, in this instance authorization; and
13. Verity and proceed with transaction; wherein the BUSAP 720 upon receiving an authorization/approval to its original authorization request verifies and proceeds with the transaction.

Figure 8:
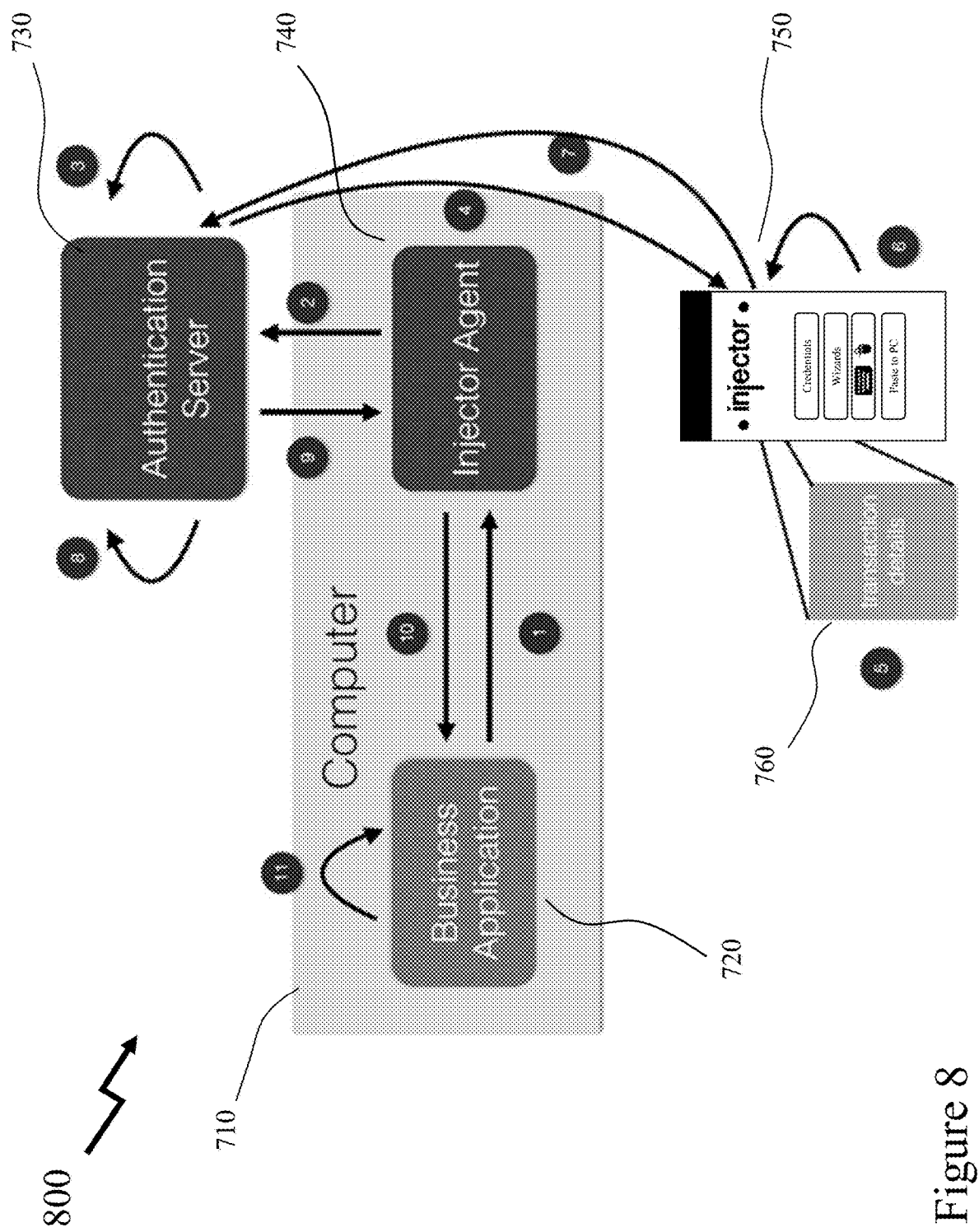
FIG. 8 depicts a secure workflow process exploiting direct server to PED verification for providing user credentials without exposing them to malware according to an embodiment of the invention.

FIG. 8 there is depicted a secure workflow process 800 exploiting direct server to PED verification for providing user credentials without exposing them to malware according to an embodiment of the invention wherein the credentials are employed by a business application (BUSAP) 720 in execution upon a computer 710, for example a FED and/or PED, wherein a PSPAP agent 740 has been installed on the computer 710. The PSPAP agent 740 communicates in this process flow only with the Universal $2^{nd}$ Factor (U2F) Authentication Server (U2FAS) 730 and not the user's PED 750, which may be local and/or remote via network 100 or networks not shown for clarity. Accordingly, the secure workflow process 800 proceeds via steps 1 to 11 which comprise:

1. Request authorization, wherein the BUSAP 720 wishes to obtain authorization for a transaction and communicates to the PSPAP agent 740;
2. Hashed transaction details, wherein the PSPAP agent 740 transmits a hashed copy of the transaction details to the U2FAS 730;
3. Create authentication challenge; wherein the U2FAS 730 creates an authentication challenge;
4. Send authentication request to PED; wherein the U2FAS 730 sends the authentication challenge to the user's PED 750;
5. Ask for user consent; wherein the PSPAP in execution upon the user's PED 750 provides the user with transaction details 760 and a request for user consent;
6. Sign authentication challenge; wherein the user signs the authentication challenge within the PSPAP if they confirm the transaction details 760;
7. Return authentication response; wherein the PSPAP, based upon the user's signing of the transaction details 760 associated with the authentication challenge, returns the user's authentication response to the authentication challenge to the U2FAS 730;
8. Verity response; wherein the U2FAS 730 verifies the received authentication response to the authentication challenge it issued;
9. Return signed server response; wherein upon a valid authentication response to the authentication challenge the U2FAS 730 transmits to the PSPAP agent 740 a signed server response authorizing the transaction;
10. Send result to application; wherein the PSPAP agent 740 sends the BUSAP 720 the response, in this instance authorization; and
11. Verity and proceed with transaction; wherein the BUSAP 720 upon receiving an authorization/approval to its original authorization request verifies and proceeds with the transaction.

Figure 9:
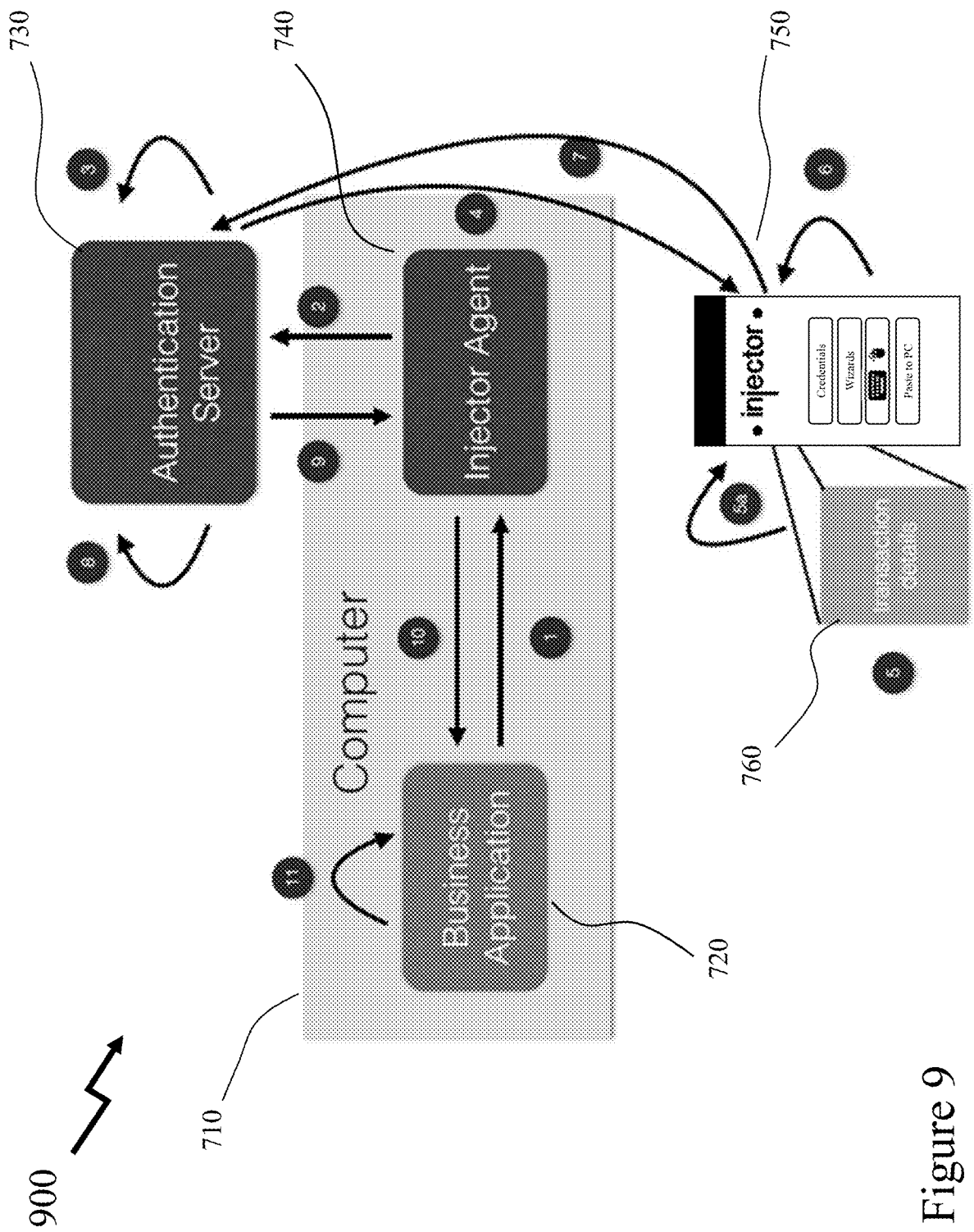
FIG. 9 depicts a secure workflow process with re-authentication for providing user credentials without exposing them to malware according to an embodiment of the invention.

FIG. 9 there is depicted a secure workflow process 900 with re-authentication for providing user credentials without exposing them to malware according to an embodiment of the invention wherein the credentials are employed by a business application (BUSAP) 720 in execution upon a computer 710, for example a FED and/or PED, wherein a PSPAP agent 740 has been installed on the computer 710. The PSPAP agent 740 communicates in this process flow only with the Universal $2^{nd}$ Factor (U2F) Authentication Server (U2FAS) 730 and not the user's PED 750, which may be local and/or remote via network 100 or networks not shown for clarity. Accordingly, the secure workflow process 900 proceeds via steps 1 to 11 which comprise:

1. Request authorization, wherein the BUSAP 720 wishes to obtain authorization for a transaction and communicates to the PSPAP agent 740;
2. Hashed transaction details, wherein the PSPAP agent 740 transmits a hashed copy of the transaction details to the U2FAS 730;
3. Create authentication challenge; wherein the U2FAS 730 creates an authentication challenge;
4. Send authentication request to PED; wherein the U2FAS 730 sends the authentication challenge to the user's PED 750;
5. Ask for user consent; wherein the PSPAP in execution upon the user's PED 750 provides the user with transaction details 760 and a request for user consent;
5A. Provide re-authentication; wherein the PSPAP in execution upon the user's PED 750 requests that the user re-authenticate themselves with their PED 750 before proceeding;
6. Sign authentication challenge; wherein the user signs the authentication challenge within the PSPAP if they confirm the transaction details 760;
7. Return authentication response; wherein the PSPAP, based upon the user's signing of the transaction details 760 associated with the authentication challenge, returns the user's authentication response to the authentication challenge to the U2FAS 730;
8. Verity response; wherein the U2FAS 730 verifies the received authentication response to the authentication challenge it issued;
9. Return signed server response; wherein upon a valid authentication response to the authentication challenge the U2FAS 730 transmits to the PSPAP agent 740 a signed server response authorizing the transaction;
10. Send result to application; wherein the PSPAP agent 740 sends the BUSAP 720 the response, in this instance authorization; and
11. Verity and proceed with transaction; wherein the BUSAP 720 upon receiving an authorization/approval to its original authorization request verifies and proceeds with the transaction.

Figure 10:
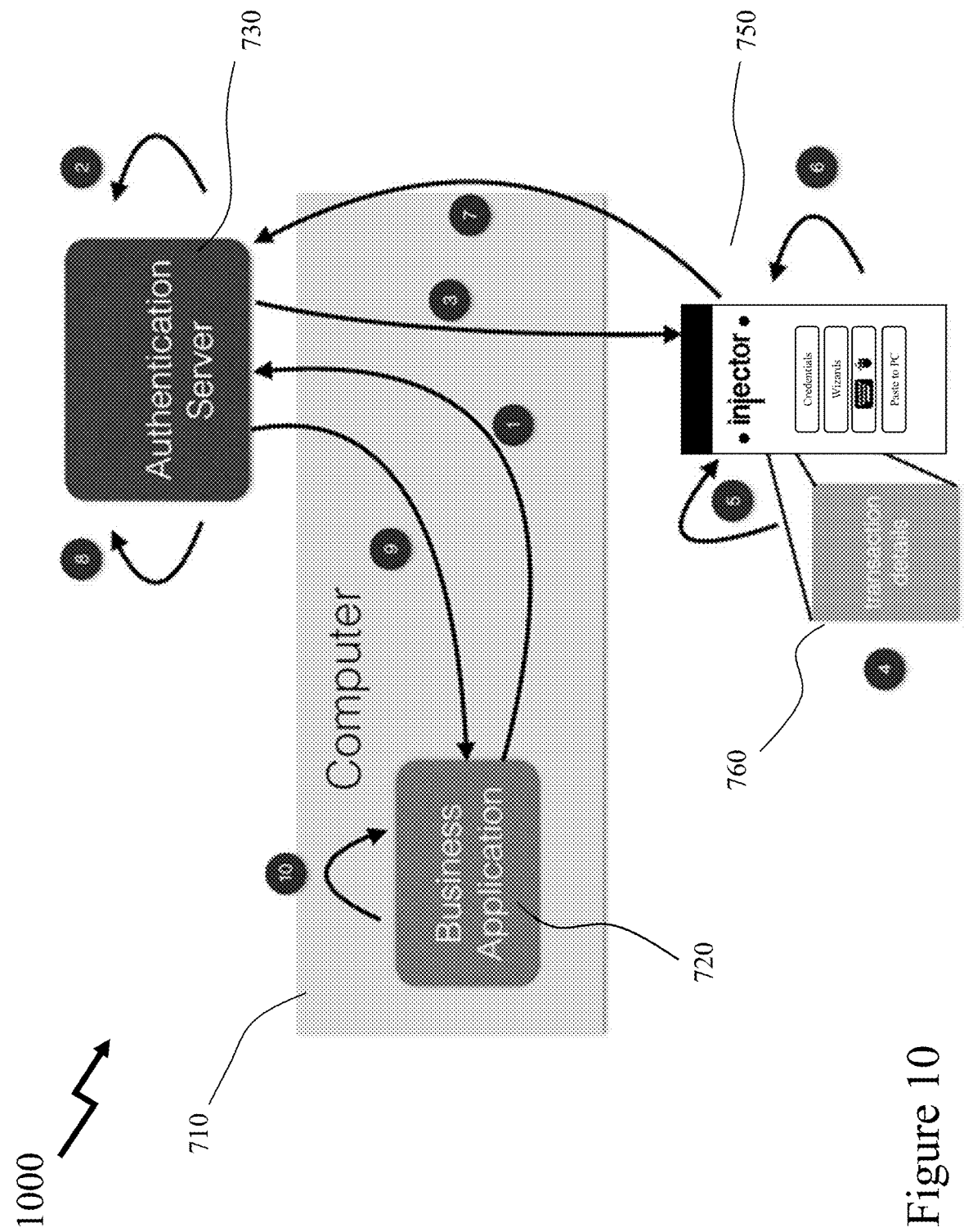
FIG. 10 depicts a secure workflow process fully integrated within a software application for providing user credentials without exposing them to malware according to an embodiment of the invention.

FIG. 10 there is depicted a secure workflow process 1000 fully integrated within a software application for providing user credentials without exposing them to malware according to an embodiment of the invention wherein the credentials are employed by a business application (BUSAP) 720 in execution upon a computer 710, for example a FED and/or PED, wherein the BUSAP 720 communicates in this process flow only with the Universal $2^{nd}$ Factor (U2F) Authentication Server (U2FAS) 730 and not any local PSPAP agent or the user's PED 750, which may be local and/or remote via network 100 or networks not shown for clarity. Accordingly, the secure workflow process 1000 proceeds via steps 1 to 10 which comprise:

1. Request authorization, wherein the BUSAP 720 wishes to obtain authorization for a transaction and generates hashed transaction details, wherein the BUSAP 720 transmits the hashed transaction details to the U2FAS 730;
2. Create authentication challenge; wherein the U2FAS 730 creates an authentication challenge;
3. Send authentication request to PED; wherein the U2FAS 730 sends the authentication challenge to the user's PED 750;
4. Ask for user consent; wherein the PSPAP in execution upon the user's PED 750 provides the user with transaction details 760 and a request for user consent;
5. Provide re-authentication; wherein the PSPAP in execution upon the user's PED 750 requests that the user re-authenticate themselves with their PED 750 before proceeding;
6. Sign authentication challenge; wherein the user signs the authentication challenge within the PSPAP if they confirm the transaction details 760;
7. Return authentication response; wherein the PSPAP, based upon the user's signing of the transaction details 760 associated with the authentication challenge, returns the user's authentication response to the authentication challenge to the U2FAS 730;
8. Verity response; wherein the U2FAS 730 verifies the received authentication response to the authentication challenge it issued;
9. Return signed server response; wherein upon a valid authentication response to the authentication challenge the U2FAS 730 transmits to the BUSAP 720 a signed server response authorizing the transaction;
10. Verity and proceed with transaction; wherein the BUSAP 720 upon receiving an authorization/approval to its original authorization request verifies and proceeds with the transaction.

Figure 11:
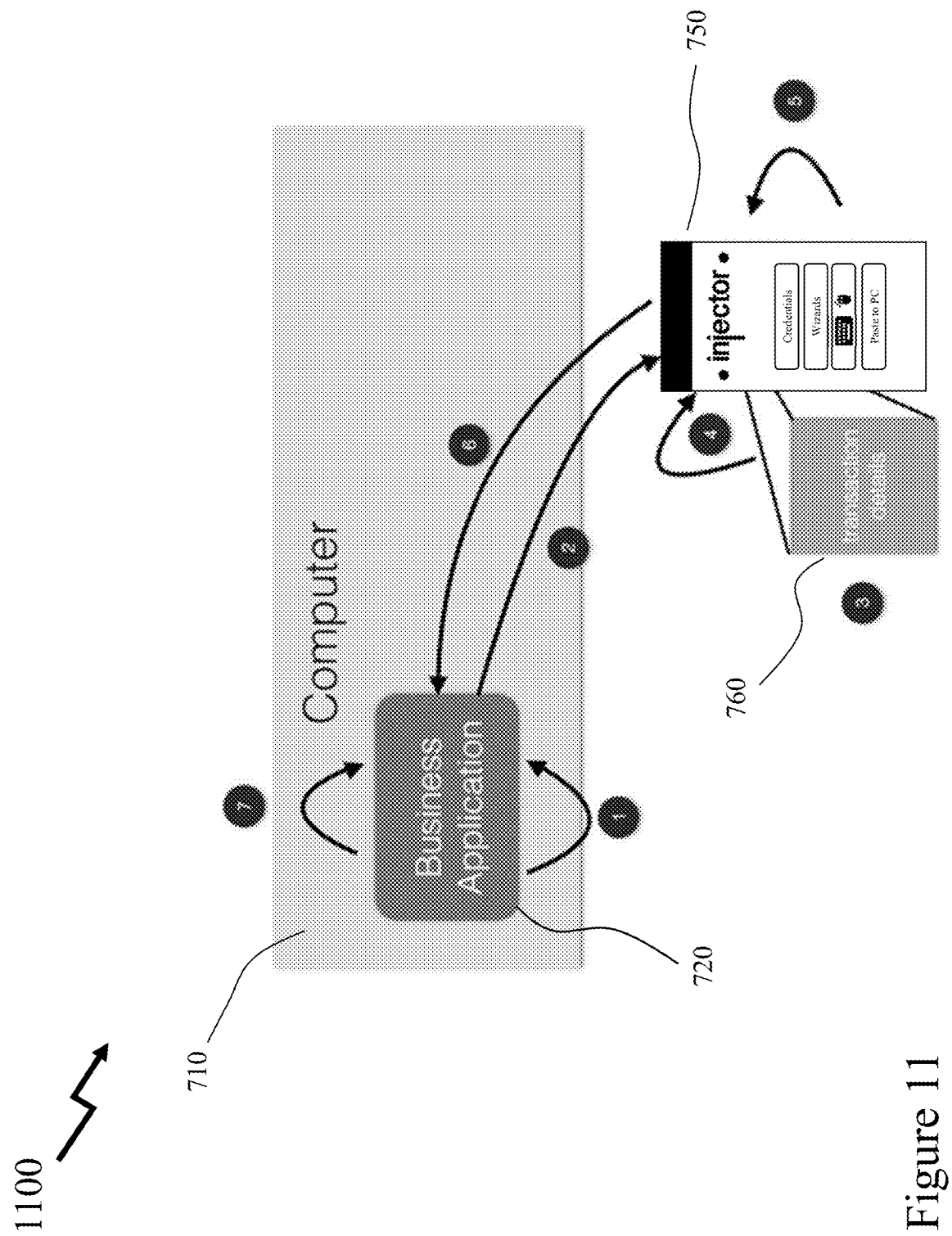
FIG. 11 depicts a secure workflow process fully integrated within a software application with public key verification for providing user credentials without exposing them to malware according to an embodiment of the invention.

FIG. 11 there is depicted a secure workflow process 1100 fully integrated within a software application with public key verification for providing user credentials without exposing them to malware according to an embodiment of the invention wherein the credentials are employed by a business application (BUSAP) 720 in execution upon a computer 710, for example a FED and/or PED, wherein the BUSAP 720 communicates in this process flow only with the user's PED 750 and not any Universal 2nd Factor (U2F) Authentication Server (U2FAS) or local PSPAP agent. Accordingly, the secure workflow process 1100 proceeds via steps 1 to 7 which comprise:

1. Request authorization and create authentication challenge, wherein the BUSAP 720 wishes to obtain authorization for a transaction and generates hashed transaction details and then creates an authentication challenge;
2. Send authentication challenge to PED; wherein the BUSAP 720 sends the authentication challenge to the user's PED 750;
3. Ask for user consent; wherein the PSPAP in execution upon the user's PED 750 provides the user with transaction details 760 and a request for user consent;
4. Provide re-authentication; wherein the PSPAP in execution upon the user's PED 750 requests that the user re-authenticate themselves with their PED 750 before proceeding;
5. Sign authentication challenge; wherein the user signs the authentication challenge within the PSPAP if they confirm the transaction details 760;
6. Return authentication response; wherein the PSPAP, based upon the user's signing of the transaction details 760 associated with the authentication challenge, returns the user's authentication response to the BUSAP 720;

7. Verity response; wherein the BUSAP 720 verifies the received authentication response to the authentication challenge it issued and proceeds with the transaction.

Figure 12:
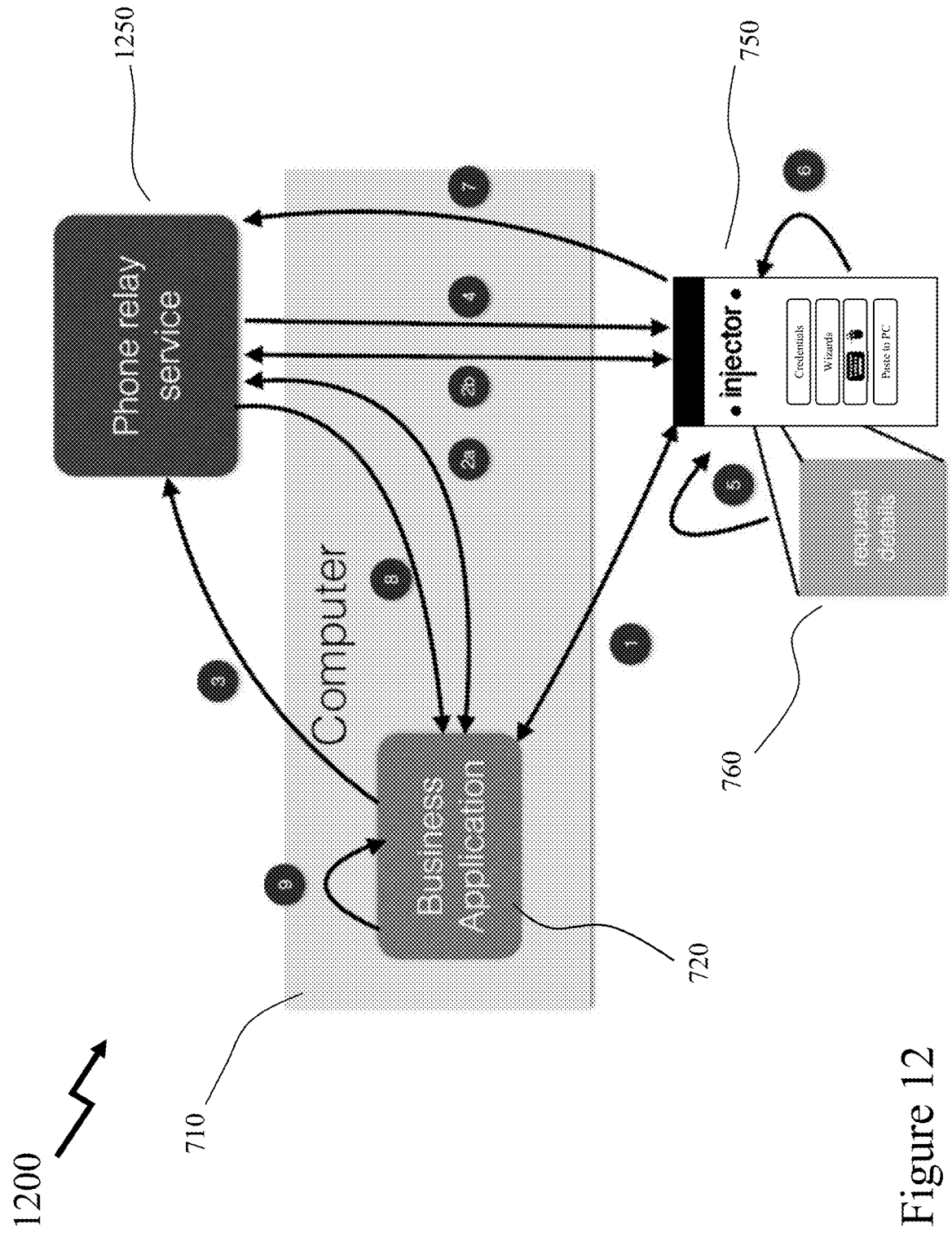
FIG. 12 depicts a secure workflow process exploiting arbitrary credentials for providing user credentials without exposing them to malware according to an embodiment of the invention.

FIG. 12 there is depicted a secure workflow process 1200 exploiting arbitrary credentials for providing user credentials without exposing them to malware according to an embodiment of the invention wherein the credentials are employed by a business application (BUSAP) 720 in execution upon a computer 710, for example a FED and/or PED, wherein the BUSAP 720 communicates via a phone relay service (PHORES) 1250 and the user's PED 750, which may be local and/or remote via network 100 or networks not shown for clarity. A PHORES 1250 may be employed for example where there is no direct communication route from the computer 710, and therein the BUSAP 720, to the user's PED 750. Accordingly, the secure workflow process 1200 proceeds via an initialization phase, step 1, a connection phase, steps 2A and 2B, and messaging phase, steps 3 to 9, wherein these steps comprise:

1. Optional out-of-band channel initialization, wherein, for example, scanned QR code(s) code tor channel parameters including security keys, seeds, etc. are exchanged/generated/acquired such as described by the inventors in U.S. patent application Ser. No. 14/662,850 filed Mar. 19, 2015 entitled "Methods and Systems for Data Entry" or alternatively the user enters one or more codes into the BUSAP 720 as displayed to the user upon their PED 750;
2A. Connect with channel information, wherein the BUSAP 720 and PHORES 1250 communicate with channel information;
2B. Connect with channel information, wherein the PED 750 and PHORES 1250 communicate with channel information;
3. Request credentials; wherein the BUSAP 720 requests credentials from the PHORES 1250;
4. Service relays request to PED; wherein the PHORES 1250 relays the request from the BUSAP 720 for credentials to the user's PED 750;
5. User consent, re-authentication, etc.; wherein the PSPAP in execution upon the user's PED 750 requests that the user re-authenticate themselves with their PED 750 before proceeding;
6. Retrieve requested credentials; wherein the PSPAP in execution upon the user's PED 750 retrieves the requested credentials where this step may also involve user key actions and/or entry upon their PED 750 verifying their presence;
7. Return credentials response; wherein the retrieved/entered credentials are communicated from the user's PED 750 to the PHORES 1250;
8. Service relays response to application; wherein the PHORES 1250 relays the retrieved/entered credentials received from the user's PED 750 to the BUSAP 720;
9. Proceed with workflow; wherein the BUSAP 720 verifies the received authentication response to the authentication challenge it issued and proceeds with the transaction.

Figure 13A:
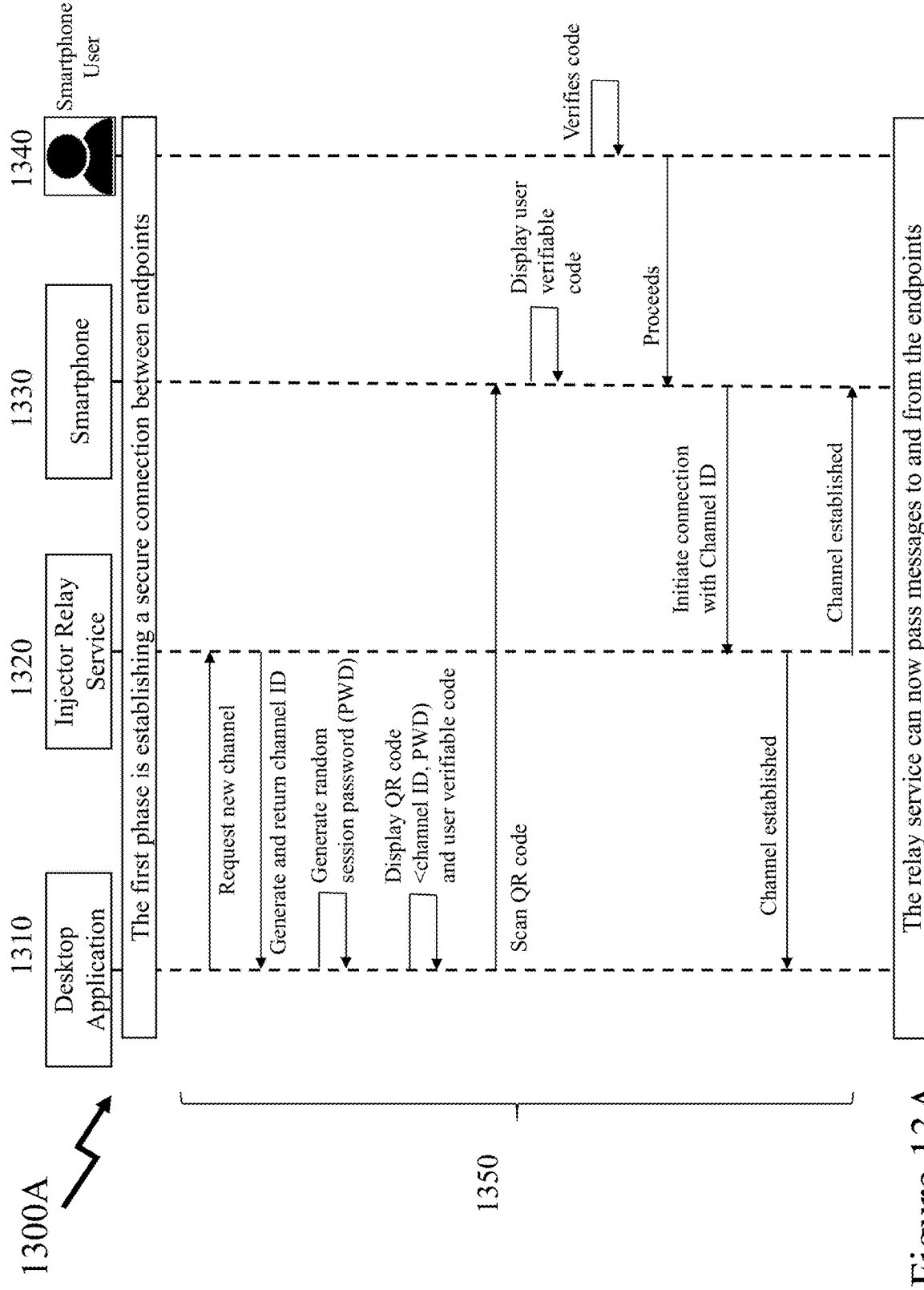
FIGS. 13A and 13B depict a secure workflow process for a high level credential management process exploiting an Internet relay service for providing user credentials without exposing them to malware according to an embodiment of the invention.
Figure 13B:
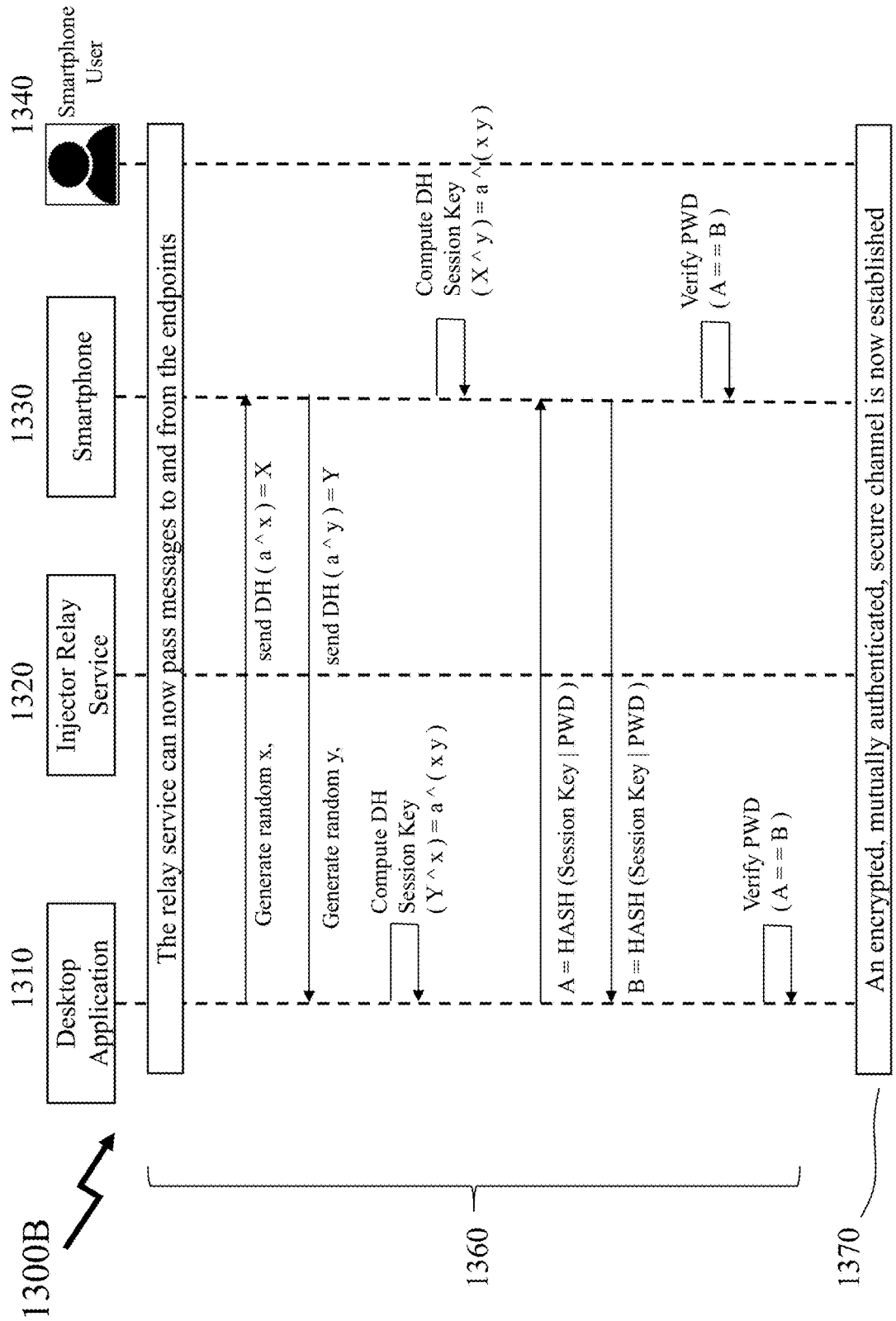

Referring to FIGS. 13A and 13B respectively there are depicted first and second secure workflow process stages 1300A and 1300B respectively for a high level credential management process exploiting an Internet relay service for providing user credentials without exposing them to malware according to an embodiment of the invention. As depicted the first and second secure workflow process stages 1300A and 1300B respectively cover communications between a desktop application (DESKAP) 1310, password injector relay service (PAIRS) 1320, user's PED (e.g. smartphone) 1330; and user 1340. As depicted a first phase 1350 establishes a secure connection between the end-points DESKAP 1310 and PED 1330 with the PAIR 1320 wherein subsequently in a second phase 1360 the PAIRS 1320 can then pass messages to/from the endpoints. Considering the first phase 1350 then an exemplary sequence of process steps depicted in Table 1 below.

TABLE 1

First Phase 1350 Exemplary Process Sequence (DH = Diffie-Hellman)

| Process Step | Source | End |
| --- | --- | --- |
| Request new channel | DESKAP 1310 | PAIRS 1320 |
| Generate and return channel ID | PAIRS 1320 | DESKAP 1310 |
| Generate random session password | DESKAP 1310 | |
| Generate and display QR Code <Channel ID: Password> and user verifiable code | DESKAP 1310 | |
| Acquire QR code | PED 1330 | |
| Display user verifiable code | PED 1330 | |
| User verifies code | User 1340 | |
| Receiver user verification | User 1340 | PED 130 |
| Initiate connection with Channel ID | PED 1330 | PAIRS 1320 |
| Establish channel #1 | PAIRS 1320 | DESKAP 1310 |
| Establish channel #2 | PAIRS 1320 | PED 1330 |

Considering the second phase 1360 then an exemplary sequence of process steps depicted in Table 2 below.

TABLE 2

Second Phase 1360 Exemplary Process Sequence (DH = Diffie-Hellman)

| Process Step | Source | End |
| --- | --- | --- |
| Generate random x, send DH(a^ x) = X | DESKAP 1310 | PED 1330 |
| Generate random y, send DH(a^ y) = Y | PED 1330 | DESKAP 1310 |
| Computer DH session key (Y^ x) = a^(xy) | DESKAP 1310 | |
| Computer DH session key (X^ y) = a^(xy) | PED 1330 | |
| A = HASH(SessionKey|PWD) | DESKAP 1310 | PED 1330 |
| B = HASH(SessionKey|PWD) | PED 1330 | DESKAP 1310 |
| Verify PWD(A == B) | PED 1350 | |
| Verify PWD(A == B) | DESKAP 1310 | |

Accordingly, an encrypted mutually authenticated secure channel 1370 after completion of the first and second phases 1350 and 1360.

Within the embodiments of the invention described supra in respect of FIG. 13 the application, e.g. DESKAP 1310 or BUSAP 720, and the user's PED, e.g. PED 750 or PED 1340, may perform a key agreement scheme such as Diffie-Hellman which is a specific method of securely exchanging cryptographic keys over a public channel wherein the two parties have no prior knowledge of each other and can jointly establish a shared secret key over an insecure channel. This key can then be used to encrypt subsequent communications using a symmetric key cipher. Other key agreement schemes may be employed. However, considering Diffie-Hellman then this gives each endpoint an encryption key for use for the session. However, the Diffie-Hellman as known in the prior art is subject to man-in-the-middle (MITM) attacks. In the instance of a user employing a PED/FED to execute an application then the user and application are normally in close proximity such that a channel identity (ID) and random password (secret) can be generated, displayed within a QR code which the user can acquire with their PED to capture this information, and then as part of the key agreement scheme, both parties can also confirm that each knows the password. Accordingly, the inventive process described in respect of FIGS. 12 and 13 allows for there to be no requirement for storing a password and accordingly, a new password can be generated each time and easily scanned by the user's smartphone (PED). Other parameters such as channel identity for the Internet relay service (e.g. password injector relay service (PAIRS) 1320) can also be established/acquired each time through such a scan. Accordingly, users are able to exploit a secure, easy to use implementation when they are within proximity to the application user interface and accordingly can exploit this "out-of-band" mechanism to exchange a password for the session.

Figure 14:
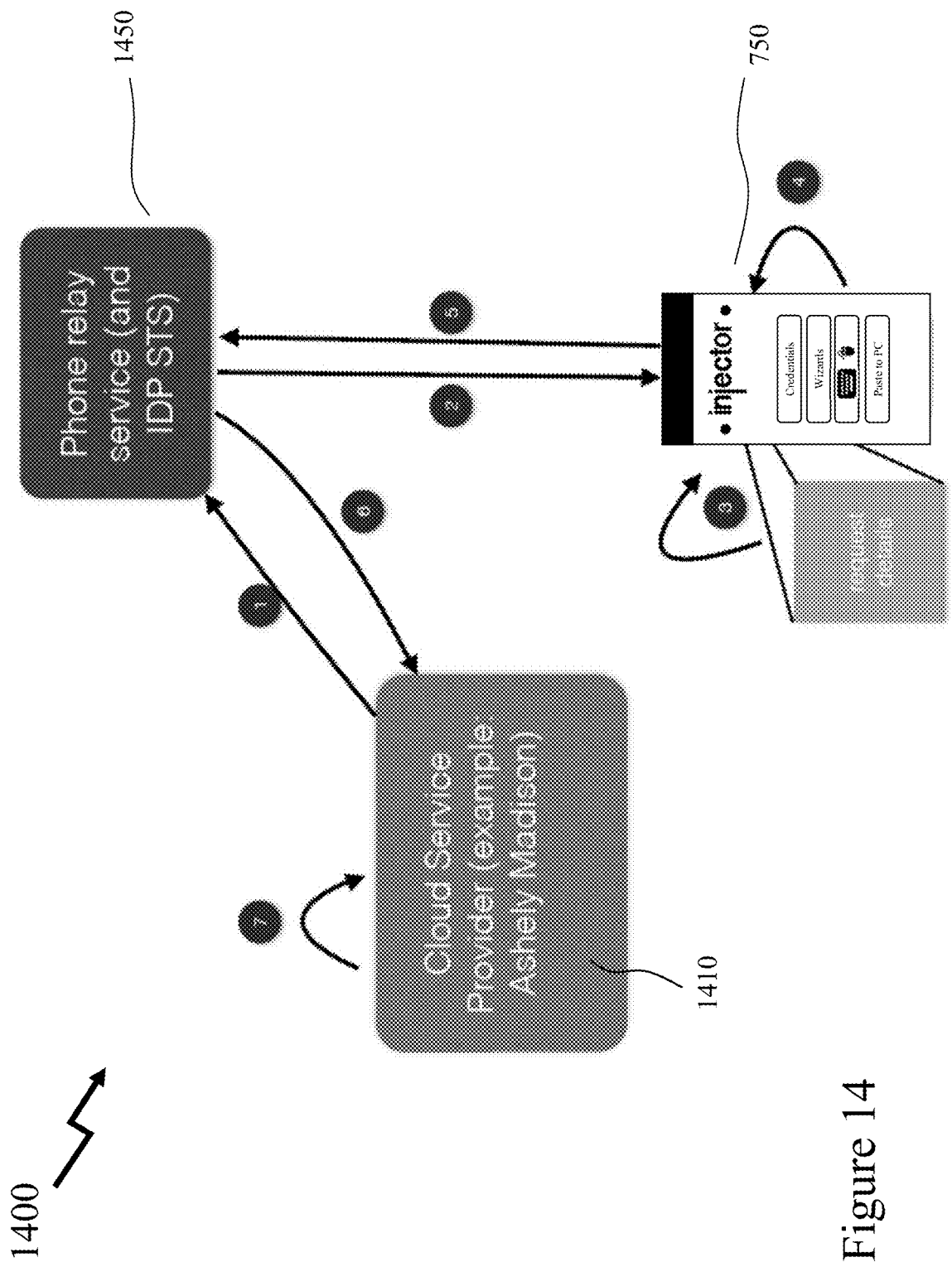
FIG. 14 depicts a secure workflow process exploiting arbitrary credentials for providing user credentials to an online resource without storing them online or exposing them to malware according to an embodiment of the invention.

Now referring to FIG. 14 there is depicted a secure workflow process 1400 exploiting arbitrary credentials for providing user credentials to an online resource without storing them online or exposing them to malware according to an embodiment of the invention. Accordingly, the credentials are to be employed by an Internet (web based) service provider (INTSERP) 1410 in execution upon one or more remote servers/systems. The INTSERP 1410 communicates via a phone relay service (PHORES) 1450 with the user upon the user's PED 750, via a network or networks not shown for clarity. Accordingly, the secure workflow process 1400 proceeds via an initialization phase and establishment of a communication channel such as described and depicted supra in respect of FIG. 13. PHORES 1450 needs user personal information (such as, credit card number, address, birthdate, etc.).

Once this communication channel has been established then workflow process 1400 proceeds via a messaging phase in steps 1 to 7, wherein these steps comprise:

INTSERP 1410 makes request via PHORES 1450 to an Identity Provider (standards based such as WS-Trust Security Token Service (STS)). This request contains required claims for the individual.

The Identity Provider via PHORES 1450 makes request to PED 750 with requested claims.

PED 750 displays the requested claims details to the user for consent, re-authentication, etc.

PED 750 retrieve requested credentials. This could be a key operation as well for improved security.

PED 750 returns the credentials response to the Identity Provider via PHORES 1450.

A standard response with the claims is provided to the INTSERP 1410.

INTSERP 1410 verifies the STS response (provided in Security Assertion Markup Language (SAML) for example, and proceeds with workflow.

It would be evident to one of skill in the art that secure workflow process 1400 goes beyond just providing authentication credentials. A common problem is that online service providers and online enterprises are still storing personal information of their users and/or members. However, their systems are open to a variety of cyberattacks including hacking wherein the unauthorized external user gains access to some or all of the personal information within their systems. This hacked data can then be used, for example, to perform unauthorized financial transactions, to expose an individual's activities, etc. Accordingly, secure workflow process 1400 stores the Personally Identifying Information (PII) securely on the user's own PED, e.g. smart phone, but makes it cloud accessible. Accordingly, the user's PII is now not stored by the online service provider or enterprise and hence they nor the user now have to worry about the online service provider being hacked and its consequences, such as the service provider \going out of business or the user's personal data and activities exposed. The method described and depicted in FIG. 14 can exploit standard protocols such as SAML and Web Services (WS) Trust, a WS specification. Within this workflow the PHORES becomes an Identity Provider which dispatches requests to user PEDs. The returned claims, the user's PII, can be encrypted for the relying party (the Service Provider).

Within embodiments of the invention presented supra discussion has been primarily focused to the acquisition of login and form fill information which can be subsequently provisioned to a computer system to automate login and form fill operations. Additionally, reference is made to replacing passwords with PSPAP generated passwords to enhance security to obsolete those previously used by the user. However, it would also be evident that the PSPAP may support Time-based One-Time-Password schemes (TOTP) wherein a different password is generated for every login. Because the password changes on every login it cannot be comprised through theft of password hacking but the new passwords must be identifiable by the receiving service, website, application, enterprise, etc. as being valid despite having not been provided to the service, website, application, enterprise, etc. Accordingly, TOTP schemes exploit a One-Time Password (OTP) or have the user's PED automatically generate these codes which are time-synchronized and have a shared secret "seed" with the service, website, application, enterprise, etc. to which access is sought, authentication provided etc., Accordingly, multiple services, websites, applications, enterprises, etc. will each have their own secret "seed" and time-synchronization process. Accordingly, the PSPAP can support these through the user following the registration process for TOTP and using a special credential item type for the TOTP seed. Once the "seed" is stored within the PSPAP it will then generate the One-Time-Password codes whenever required.

Within embodiments of the invention presented supra the primary configuration has been a user's PED in conjunction with a computer system. However, it would be evident that the computer system may be generalized to a FED or another PED, e.g. an ATM, laptop, etc. and that the interfaces may be wired and/or wireless between the device executing the PSPAP and the device having the login screen requiring user input.

Within the embodiments of the invention presented supra the primary configuration has been a user's PED having installed and in execution the PSPAP. However, it would be evident that in other embodiments of the invention the PSPAP may in execution upon a FED and be employed to provide password, credential, and identity information to applications, services, web pages and web browsers upon another FED or a PED. Accordingly, a gaming console may be employed to provide PSPAP functionality to an Internet enabled television. It would also be evident that a PED may also include a wearable device or a combination of wearable devices.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alpha-numeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
providing a first software application in execution upon a first electronic device comprising a first microprocessor coupled to a communications network and a communications interface;
providing an authentication server coupled to the communications network;
providing a software agent upon the first electronic device in communication with the authentication server via the communications network and a second software application upon a second electronic device via the communications interface of the first electronic device; and
providing the second software application in execution upon the second electronic device, the second electronic device associated with a user and comprising a second microprocessor and another communications interface supporting communications via the communications interface of the first electronic device;
verifying a transaction to be performed by a software application in dependence upon user credentials; and
performing the transaction; wherein
the verification comprises:
generating a user verifiable code and an authentication challenge comprising at least a barcode;
transmitting and rendering the barcode to the user;
scanning, by the user, of the rendered barcode and generating another code in dependence upon the scanned barcode;
rendering the another code to the user;
transmitting and rendering the user verifiable code to the user; and
the user determining to sign the authentication challenge in dependence upon whether the another code matches the user verifiable code;
the first software application, the authentication server, the software agent, and the second software application execute a secure workflow process which requests the authorisation for the transaction and upon receiving authorization verifies and proceeds with the transaction; and
the secure workflow process comprises the steps of:
requesting authorization wherein the first software application communicates to the software agent;
providing hashed transaction details, wherein the software agent transmits a hashed copy of the transaction details to the authentication server;
creating an authentication challenge wherein the authentication server creates the authentication challenge;
returning the authentication request wherein the authentication server communicates the authentication challenge to the software agent as a return authentication request;
sending authentication challenge where in the software agent sends the authentication challenge to the second software application;
requesting user consent wherein the second software application provides the user with the transaction details and a request for user consent;
signing the authentication challenge wherein the user signs the authentication challenge within the second software application upon determining to authenticate the transaction;
returning authentication response wherein the second software application based upon the user's signing of the transaction details associated with the authentication challenge returns the user's authentication response to the authentication challenge to the software agent;
sending response for verification wherein the software agent transmits the received authentication response to the authentication challenge to the authentication server;
verifying response wherein the authentication server verifies the received authentication response to the authentication challenge it issued;
returning signed server response wherein upon receiving a valid authentication response to the authentication challenge the authentication server transmits to the software agent a signed server response authorizing the transaction;
sending result wherein the software agent sends the first software application the signed server response; and
proceeding with transaction wherein the first software application upon receiving the signed server response to its original authorization request verifies and proceeds with the transaction.

2. A method comprising:
providing a first software application in execution upon a first electronic device comprising a first microprocessor coupled to a communications network and a communications interface;
providing an authentication server coupled to the communications network;
providing a software agent upon the first electronic device in communication with the authentication server via the communications network and a second software application upon a second electronic device via the communications interface of the first electronic device; and
providing the second software application in execution upon the second electronic device, the second electronic device associated with a user and comprising a second microprocessor and another communications interface supporting communications via the communications interface of the first electronic device;
verifying a transaction to be performed by a software application in dependence upon user credentials; and
performing the transaction; wherein
the verification comprises:
generating a user verifiable code and an authentication challenge comprising at least a barcode;
transmitting and rendering the barcode to the user;
scanning, by the user, of the rendered barcode and generating another code in dependence upon the scanned barcode;
rendering the another code to the user;
transmitting and rendering the user verifiable code to the user; and
the user determining to sign the authentication challenge in dependence upon whether the another code matches the user verifiable code;
the first software application, the authentication server, the software agent, and the second software application execute a secure workflow process which requests the authorisation for the transaction and upon receiving authorization verifies and proceeds with the transaction; and the secure workflow process comprises the steps of:
requesting authorization wherein the first software application communicates to the software agent;
providing hashed transaction details, wherein the software agent transmits a hashed copy of the transaction details to the authentication server;
creating an authentication challenge wherein the authentication server creates the authentication challenge;
returning the authentication request wherein the authentication server communicates the authentication challenge to the second software application as a return authentication request;
requesting user consent wherein the second software application provides the user with the transaction details and a request for user consent;
signing the authentication challenge wherein the user signs the authentication challenge within the second software application upon determining to authenticate the transaction;
returning authentication response wherein the second software application based upon the user's signing of the transaction details associated with the authentication challenge returns the user's authentication response to the authentication challenge to the authentication server;
verifying response wherein the authentication server verifies the received authentication response to the authentication challenge it issued;
returning signed server response wherein upon receiving a valid authentication response to the authentication challenge the authentication server transmits to the software agent a signed server response authorizing the transaction;
sending result wherein the software agent sends the first software application the signed server response; and
proceeding with transaction wherein the first software application upon receiving the signed server response to its original authorization request verifies and proceeds with the transaction.

3. A method comprising:
providing a first software application in execution upon a first electronic device comprising a first microprocessor coupled to a communications network and a communications interface;
providing an authentication server coupled to the communications network;
providing a software agent upon the first electronic device in communication with the authentication server via the communications network and a second software application upon a second electronic device via the communications interface of the first electronic device; and
providing the second software application in execution upon the second electronic device, the second electronic device associated with a user and comprising a second microprocessor and another communications interface supporting communications via the communications interface of the first electronic device;
verifying a transaction to be performed by a software application in dependence upon user credentials; and performing the transaction; wherein
the verification comprises:
generating a user verifiable code and an authentication challenge comprising at least a barcode;
transmitting and rendering the barcode to the user;
scanning, by the user, of the rendered barcode and generating another code in dependence upon the scanned barcode;
rendering the another code to the user;
transmitting and rendering the user verifiable code to the user; and
the user determining to sign the authentication challenge in dependence upon whether the another code matches the user verifiable code;
the first software application, the authentication server, the software agent, and the second software application execute a secure workflow process which requests the authorisation for the transaction and upon receiving authorization verifies and proceeds with the transaction; and
the secure workflow process comprises the steps of:
requesting authorization wherein the first software application communicates to the software agent;
providing hashed transaction details, wherein the software agent transmits a hashed copy of the transaction details to the authentication server;
creating an authentication challenge wherein the authentication server creates the authentication challenge;
returning the authentication request wherein the authentication server communicates the authentication challenge to the second software application as a return authentication request;
requesting user consent wherein the second software application provides the user with the transaction details and a request for user consent;
requesting user re-authentication wherein the second software application requests that the user re-authenticate them self upon the second electronic device before proceeding to execute the remainder of the secure workflow process otherwise the secure workflow process is terminated;
signing the authentication challenge wherein the user signs the authentication challenge within the second software application upon determining to authenticate the transaction;
returning authentication response wherein the second software application based upon the user's signing of the transaction details associated with the authentication challenge returns the user's authentication response to the authentication challenge to the authentication server;
verifying response wherein the authentication server verifies the received authentication response to the authentication challenge it issued;
returning signed server response wherein upon receiving a valid authentication response to the authentication challenge the authentication server transmits to the software agent a signed server response authorizing the transaction;
sending result wherein the software agent sends the first software application the signed server response; and
proceeding with transaction wherein the first software application upon receiving the signed server response to its original authorization request verifies and proceeds with the transaction.

4. A method comprising:
providing a first software application in execution upon a first electronic device comprising a first microprocessor coupled to a communications network and a communications interface; and
providing a second software application in execution upon a second electronic device, the second electronic device associated with a user and comprising a second microprocessor and another communications interface supporting communications via the communications network to the authentication server;
verifying a transaction to be performed by a software application in dependence upon user credentials; and
performing the transaction; wherein
the verification comprises:
  generating a user verifiable code and an authentication challenge comprising at least a barcode;
  transmitting and rendering the barcode to the user;
  scanning, by the user, of the rendered barcode and generating another code in dependence upon the scanned barcode;
  rendering the another code to the user;
  transmitting and rendering the user verifiable code to the user; and
  the user determining to sign the authentication challenge in dependence upon whether the another code matches the user verifiable code;
the first software application and the second software application execute a secure workflow process which requests the authorisation for the transaction and upon receiving authorization verifies and proceeds with the transaction; and
the secure workflow process comprises the steps of:
  requesting authorization wherein the first software application generates a hashed copy of the transaction details;
  generating an authentication challenge wherein the first software application generates the authentication challenge;
  providing hashed transaction details and challenge wherein the first software application transmits the hashed copy of the transaction details and the authentication challenge to the second software application;
  requesting user consent wherein the second software application provides the user with the transaction details and a request for user consent;
  requesting user re-authentication wherein the second software application requests that the user re-authenticate them self upon the second electronic device before proceeding to execute the remainder of the secure workflow process otherwise the secure workflow process is terminated;
  signing the authentication challenge wherein the user signs the authentication challenge within the second software application if they confirm the transaction details;
  returning authentication response wherein the second software application based upon the user's signing of the authentication challenge associated with the transaction details returns the user's signed authentication response to the first software application;
  verifying the user's signed authentication response with the first software application; and
  proceeding with transaction with the first software application upon verifying the user's signed authentication response.

5. A method comprising:
providing a first software application in execution upon a first electronic device comprising a first microprocessor coupled to a communications network and a communications interface;
providing relay service coupled to the communications network; and
providing a second software application in execution upon a second electronic device, the second electronic device associated with a user and comprising a second microprocessor and another communications interface supporting communications via the communications network to the authentication server;
verifying a transaction to be performed by a software application in dependence upon user credentials; and
performing the transaction; wherein
the verification comprises:
  generating a user verifiable code and an authentication challenge comprising at least a barcode;
  transmitting and rendering the barcode to the user;
  scanning, by the user, of the rendered barcode and generating another code in dependence upon the scanned barcode;
  rendering the another code to the user;
  transmitting and rendering the user verifiable code to the user; and
  the user determining to sign the authentication challenge in dependence upon whether the another code matches the user verifiable code;
the first software application, the authentication server and the second software application execute a secure workflow process which requests the authorisation for the transaction and upon receiving authorization verifies and proceeds with the transaction; and
the secure workflow process comprises:
  establishing an out-of-band channel initialization process to establish channel information by direct communications between the first software application upon the first electronic device and the second software application upon the second electronic device;
  establishing a first connection between the first software application and the relay service in dependence upon the channel information;
  establishing a second connection between the second software application and the relay service in dependence upon the channel information;
  generating an authentication challenge to request credentials wherein the first software application transmits a credential request to the relay service;
  relaying the authentication challenge wherein the relay service forwards the received authentication challenge comprising the credential request to the second software application;
  requesting user re-authentication wherein the second software application requests that the user re-authenticate them self upon the second electronic device before proceeding to execute the remainder of the secure workflow process otherwise the secure workflow process is terminated;
  establishing user consent wherein the second software application establishes user consent to the credential request within the authentication challenge by the user signing the authentication challenge;
  credential retrieval wherein the second software application retrieves the requested credentials from a memory accessible to the second electronic device;

returning credentials wherein the retrieved credentials are communicated from the second software application to the relay service;

relaying credentials wherein the relay service transmits the received retrieved credentials to the first software application;

verifying the user's relayed credentials with the first software application; and proceeding with transaction with the first software application upon verifying the user's relayed credentials.

6. The method according to claim 5, wherein establishing the out-of-band channel initialization process between the first software application and the second software application comprises:

establishing at least one of a security key and a seed for an encryption process to be employed in exchanging information between the first software application and the second software application via the relay service via an image based information exchange; wherein the image based information exchange comprises:

establishing the at least one of the security key and the seed for the encryption process with the first software application;

generating a machine readable code upon a display forming part of the first electronic device associated with the at least one of the security key and the seed for the encryption process;

capturing an image of the machine readable code with a camera forming part of the second electronic device; and generating the at least one of the security key and the seed for the encryption process from the captured image of the machine readable code.

7. The method according to claim 5, wherein the out-of-band channel initialization process generates a new password every time it is initiated.

8. The method according to claim 5, wherein the out-of-band channel initialization process establishes a channel identity for the relay service ever time it is initiated.

9. The method according to claim 5, wherein the step of establishing user consent further comprises establishing a physical presence of the user with the second electronic device;

establishing a physical presence is established in dependence upon at least one of user key actions and user actions with respect to the second electronic device; and the at least one of user key actions and user actions with respect to the second electronic device are independent of the actions of the user in providing consent.

10. A method comprising:

providing an internet service provider (INTSERP) in execution upon one or more remote servers, each remote server comprising a first microprocessor and coupled to a communications network;

providing relay service coupled to the communications network; and providing a software application in execution upon an electronic device, the electronic device associated with a user and comprising a second microprocessor and another communications interface supporting communications via the communications network to the one or more remote servers;

verifying a transaction to be performed by a software application in dependence upon user credentials; and performing the transaction; wherein the verification comprises:

generating a user verifiable code and an authentication challenge comprising at least a barcode;

transmitting and rendering the barcode to the user;

scanning, by the user, of the rendered barcode and generating another code in dependence upon the scanned barcode;

rendering the another code to the user;

transmitting and rendering the user verifiable code to the user; and the user determining to sign the authentication challenge in dependence upon whether the another code matches the user verifiable code;

the software application, the relay service and the INTSERP execute a secure workflow process which requests the authorisation for the transaction and upon receiving authorization verifies and proceeds with the transaction; and the secure workflow process comprises:

a first phase relating to initialization phase and establishment of a communication channel comprising an authentication challenge; and a second phase relating to establishing credentials comprising:

generating an initial request from the INTSERP to an identity provider via the relay service, the initial request containing requested claims for the user;

generating a subsequent request from the identity provider to the software application via the relay service, the subsequent request comprising the requested claims;

rendering the requested claims to the user upon the electronic device to establish consent of the user;

retrieving the credentials from a memory of the electronic device in dependence upon receiving consent from user via an interface of the electronic device;

transmitting the retrieved credentials to the identity provider via the relay service;

transmitting a response to the INTSERP comprising the retrieved credentials; and upon verifying the retrieved credentials provided in response to the initial request and its associated requested claims executing the step of performing the transaction.

11. The method according to claim 10, wherein at least one of:

the secure workflow process executes independent of either the identity provider or relay service storing personally identifying information on the user; and the identity provider is the relay service.

12. The method according to claim 10, further comprising providing another software application in execution upon another electronic device comprising another microprocessor coupled to a communications network and a communications interface; wherein the another electronic device is associated with at least one of the INTSERP and the relay service; and the first phase of the secure workflow process comprises:

establishing an out-of-band channel initialization process to establish channel information by direct communications between a first software application upon the another electronic device and the second software application upon the second electronic device;

establishing a first connection between the another software application and the relay service in dependence upon the channel information;

establishing a second connection between the software application and the relay service in dependence upon the channel information;

generating an authentication challenge to request credentials wherein the another software application transmits a credential request to the relay service;

relaying the authentication challenge wherein the relay service forwards the received authentication challenge comprising the credential request to the software application;

requesting user re-authentication wherein the software application requests that the user re-authenticate them self upon the electronic device before proceeding to execute the remainder of the secure workflow process otherwise the secure workflow process is terminated;

establishing user consent wherein the second software application establishes user consent to the credential request within the authentication challenge by the user signing the authentication challenge;

credential retrieval wherein the software application retrieves the requested credentials from a memory accessible to the electronic device;

returning credentials wherein the retrieved credentials are communicated from the software application to the relay service;

relaying credentials wherein the relay service transmits the received retrieved credentials to the another software application;

verifying the user's relayed credentials with the another software application.

\* \* \* \* \*